(12) United States Patent
Allan et al.

(10) Patent No.: US 9,898,756 B2
(45) Date of Patent: Feb. 20, 2018

(54) METHOD AND APPARATUS FOR DISPLAYING ADS DIRECTED TO PERSONAS HAVING ASSOCIATED CHARACTERISTICS

(75) Inventors: Kevin Allan, Seattle, WA (US); Thomas S. Huseby, Seattle, WA (US); William Munslow, Seattle, WA (US); David Pratt, Seattle, WA (US); Brian Roundtree, Seattle, WA (US)

(73) Assignee: AutoGraph, Inc., Seattle, WA (US)

( * ) Notice: Subject to any disclaimer, the term of this patent is extended or adjusted under 35 U.S.C. 154(b) by 50 days.

(21) Appl. No.: 13/490,447

(22) Filed: Jun. 6, 2012

(65) Prior Publication Data

US 2013/0054366 A1 Feb. 28, 2013

Related U.S. Application Data

(60) Provisional application No. 61/603,216, filed on Feb. 24, 2012, provisional application No. 61/597,136, (Continued)

(51) Int. Cl.
*G06Q 30/00* (2012.01)
*G06Q 30/02* (2012.01)

(52) U.S. Cl.
CPC ..... *G06Q 30/0255* (2013.01); *G06Q 30/0241* (2013.01); *G06Q 30/0251* (2013.01); (Continued)

(58) Field of Classification Search
CPC .......... G06Q 30/0241; G06Q 30/0251; G06Q 30/0261 (Continued)

(56) References Cited

U.S. PATENT DOCUMENTS 5,991,735 A 11/1999 Gerace
6,587,127 B1 7/2003 Leeke et al.
(Continued)

FOREIGN PATENT DOCUMENTS

CN 101286173 10/2008
CN 102016904 4/2011
(Continued)

OTHER PUBLICATIONS

International Search Report and Written Opinion for PCT/US2012/41178, Applicant: Nfluence Media, Inc., dated Aug. 17, 2012, 6 pages.
(Continued)

*Primary Examiner* — Johnna R Loftis
(74) *Attorney, Agent, or Firm* — Perkins Coie LLP

(57) ABSTRACT

A system and method for directing self-targeted advertising to users who are interested in receiving it. A user creates or adopts one or more personas that define a number of characteristics that the user has or wants to be associated with. The characteristics of the personas can be used by advertisers to define members of a target audience. Each persona included in a target audience has an address or identifier to which ads are sent. In one embodiment, users are shown a user interface screen with icons representing a number of brands. The user provides input that indicates whether they have different opinions of the brands. Based on the input received, an estimate is made of the likelihood that the user has a number of characteristics. The user can arrange the icons representing the brands on the user interface screen to indicate if the user likes or dislikes the brand.

20 Claims, 32 Drawing Sheets

Related U.S. Application Data filed on Feb. 9, 2012, provisional application No. 61/567,594, filed on Dec. 6, 2011, provisional application No. 61/533,049, filed on Sep. 9, 2011, provisional application No. 61/506,601, filed on Jul. 11, 2011, provisional application No. 61/493,965, filed on Jun. 6, 2011.

(52) U.S. Cl.
CPC ..... *G06Q 30/0261* (2013.01); *G06Q 30/0269* (2013.01); *G06Q 30/0277* (2013.01)

(58) Field of Classification Search
USPC .................................. 705/14.49, 14.5, 14.66
See application file for complete search history.

(56) References Cited

U.S. PATENT DOCUMENTS

| Patent/Pub No. | Date | Name |
|---|---|---|
| 6,603,969 B1* | 8/2003 | Vuoristo ................ H04W 8/18 455/433 |
| 6,611,842 B1* | 8/2003 | Brown |
| 7,062,510 B1 | 6/2006 | Eldering |
| 7,503,045 B1 | 3/2009 | Aziz et al. |
| 7,610,255 B2 | 10/2009 | Willcock et al. |
| 7,660,737 B1 | 2/2010 | Lim et al. |
| 7,707,171 B2 | 4/2010 | Willcock et al. |
| 7,809,740 B2 | 10/2010 | Chung et al. |
| 7,904,442 B2 | 3/2011 | Bahn et al. |
| 7,942,319 B2 | 5/2011 | Bezancon et al. |
| 8,108,245 B1 | 1/2012 | Hosea et al. |
| 8,255,786 B1 | 8/2012 | Gattani et al. |
| 8,271,894 B1 | 9/2012 | Mayers |
| 8,306,977 B1 | 11/2012 | Gildfind |
| 8,370,330 B2 | 2/2013 | Priyadarshan et al. |
| 8,429,527 B1 | 4/2013 | Arbogast |
| 8,572,711 B1 | 10/2013 | Klau et al. |
| 8,620,748 B1 | 12/2013 | Ruarte et al. |
| 8,650,141 B2 | 2/2014 | Willcock et al. |
| 8,751,430 B2 | 6/2014 | Willcock et al. |
| 8,755,823 B2 | 6/2014 | Proietti et al. |
| 9,183,203 B1 | 11/2015 | Tuchman et al. |
| 2002/0123368 A1 | 9/2002 | Yamadera et al. |
| 2002/0140728 A1* | 10/2002 | Zimmerman ...... H04N 5/44513 715/745 |
| 2003/0055722 A1* | 3/2003 | Perreault et al. ................ 705/14 |
| 2003/0061607 A1* | 3/2003 | Hunter et al. ................... 725/32 |
| 2003/0131260 A1 | 7/2003 | Hanson et al. |
| 2003/0144035 A1 | 7/2003 | Weinblatt et al. |
| 2003/0157963 A1 | 8/2003 | Collot |
| 2004/0014486 A1 | 1/2004 | Carlton et al. |
| 2004/0024739 A1 | 2/2004 | Copperman et al. |
| 2004/0049673 A1* | 3/2004 | Song ................ G06F 17/3089 713/150 |
| 2004/0088513 A1 | 5/2004 | Biessener et al. |
| 2004/0148638 A1 | 7/2004 | Weisman et al. |
| 2004/0215692 A1* | 10/2004 | Vasudevan et al. .......... 709/201 |
| 2004/0268265 A1* | 12/2004 | Berger ................ G06F 1/1622 715/752 |
| 2005/0044569 A1 | 2/2005 | Marcus |
| 2005/0097008 A1 | 5/2005 | Ehring et al. |
| 2005/0131762 A1 | 6/2005 | Bharat et al. |
| 2005/0216346 A1 | 9/2005 | Kusumoto et al. |
| 2005/0240608 A1 | 10/2005 | Jones et al. |
| 2005/0283796 A1* | 12/2005 | Flickinger ...................... 725/35 |
| 2006/0010400 A1 | 1/2006 | Dehlin et al. |
| 2006/0242013 A1 | 10/2006 | Agarwal et al. |
| 2006/0259360 A1 | 11/2006 | Flinn et al. |
| 2007/0030824 A1 | 2/2007 | Ribaudo et al. |
| 2007/0038931 A1 | 2/2007 | Allaire et al. |
| 2007/0067331 A1 | 3/2007 | Schachter et al. |
| 2007/0094083 A1 | 4/2007 | Yruski et al. |
| 2007/0101276 A1* | 5/2007 | Yuen ................ G06F 17/30873 715/757 |
| 2007/0177554 A1 | 8/2007 | Yang et al. |
| 2007/0184820 A1* | 8/2007 | Marshall ................ G06Q 30/02 455/414.3 |
| 2007/0208679 A1 | 9/2007 | Tseng et al. |
| 2007/0244872 A1 | 10/2007 | Hancock |
| 2007/0257792 A1 | 11/2007 | Gold |
| 2007/0260624 A1 | 11/2007 | Chung et al. |
| 2007/0294091 A1 | 12/2007 | Cohen et al. |
| 2008/0035734 A1 | 2/2008 | Challa et al. |
| 2008/0077580 A1 | 3/2008 | Ozveren et al. |
| 2008/0097843 A1 | 4/2008 | Menon et al. |
| 2008/0097867 A1 | 4/2008 | Engle |
| 2008/0126175 A1 | 5/2008 | Alexander |
| 2008/0147645 A1 | 6/2008 | O'Malley et al. |
| 2008/0201734 A1 | 8/2008 | Lyon et al. |
| 2008/0235085 A1 | 9/2008 | Kovinsky et al. |
| 2008/0249987 A1 | 10/2008 | Ogasawara |
| 2008/0262908 A1 | 10/2008 | Broady et al. |
| 2008/0270398 A1 | 10/2008 | Landau et al. |
| 2008/0288331 A1 | 11/2008 | Magids et al. |
| 2008/0290987 A1 | 11/2008 | Li |
| 2008/0319862 A1 | 12/2008 | Golan et al. |
| 2009/0006214 A1 | 1/2009 | Lerman et al. |
| 2009/0013268 A1 | 1/2009 | Amit |
| 2009/0018915 A1 | 1/2009 | Fisse |
| 2009/0028434 A1 | 1/2009 | Vanhoucke et al. |
| 2009/0063551 A1 | 3/2009 | Shuster |
| 2009/0089310 A1 | 4/2009 | Lara et al. |
| 2009/0099932 A1 | 4/2009 | Ahopelto |
| 2009/0106096 A1 | 4/2009 | Horowitz et al. |
| 2009/0106113 A1 | 4/2009 | Arora et al. |
| 2009/0112714 A1 | 4/2009 | Steelberg et al. |
| 2009/0132943 A1 | 5/2009 | Minsky et al. |
| 2009/0164464 A1 | 6/2009 | Carrico et al. |
| 2009/0182631 A1 | 7/2009 | Higgins et al. |
| 2009/0182810 A1 | 7/2009 | Higgins et al. |
| 2009/0183179 A1 | 7/2009 | Keith et al. |
| 2009/0234691 A1 | 9/2009 | Steelberg et al. |
| 2009/0271256 A1 | 10/2009 | Toebes et al. |
| 2009/0276453 A1 | 11/2009 | Trout et al. |
| 2009/0276459 A1 | 11/2009 | Trout et al. |
| 2009/0305667 A1 | 12/2009 | Schultz |
| 2009/0308922 A1 | 12/2009 | Chaum et al. |
| 2009/0319648 A1 | 12/2009 | Dutta et al. |
| 2010/0057743 A1 | 3/2010 | Pierce |
| 2010/0063872 A1 | 3/2010 | Patel et al. |
| 2010/0076838 A1 | 3/2010 | Steelberg et al. |
| 2010/0094878 A1 | 4/2010 | Soroca et al. |
| 2010/0161424 A1* | 6/2010 | Sylvain ...................... 705/14.66 |
| 2010/0169313 A1 | 7/2010 | Kenedy et al. |
| 2010/0169803 A1 | 7/2010 | Mazzei et al. |
| 2010/0179950 A1 | 7/2010 | Willcock et al. |
| 2010/0185732 A1 | 7/2010 | Hyman |
| 2010/0218141 A1* | 8/2010 | Xu ...................... G06F 3/04817 715/834 |
| 2010/0262497 A1 | 10/2010 | Karlsson |
| 2010/0293036 A1 | 11/2010 | Meyer et al. |
| 2010/0293569 A1 | 11/2010 | Kusumoto et al. |
| 2010/0299140 A1 | 11/2010 | Witbrock et al. |
| 2010/0299226 A1 | 11/2010 | Steelberg et al. |
| 2010/0306702 A1 | 12/2010 | Warner |
| 2010/0318405 A1 | 12/2010 | Kirkby |
| 2010/0331016 A1 | 12/2010 | Dutton et al. |
| 2011/0013528 A1 | 1/2011 | Chen et al. |
| 2011/0015996 A1 | 1/2011 | Kassoway et al. |
| 2011/0024490 A1 | 2/2011 | Kangas et al. |
| 2011/0025842 A1 | 2/2011 | King et al. |
| 2011/0035263 A1 | 2/2011 | Ramanathan |
| 2011/0055017 A1 | 3/2011 | Solomon et al. |
| 2011/0066497 A1 | 3/2011 | Gopinath et al. |
| 2011/0072047 A1 | 3/2011 | Wang et al. |
| 2011/0093780 A1* | 4/2011 | Dunn ................ G06Q 30/0269 715/706 |
| 2011/0099064 A1 | 4/2011 | Lyon et al. |
| 2011/0106613 A1 | 5/2011 | Felt et al. |
| 2011/0107433 A1 | 5/2011 | Steelberg et al. |
| 2011/0126122 A1* | 5/2011 | Forman et al. ................ 715/745 |
| 2011/0145039 A1 | 6/2011 | McCarney et al. |
| 2011/0153429 A1 | 6/2011 | Ullah |
| 2011/0161331 A1 | 6/2011 | Chung et al. |

(56) References Cited

U.S. PATENT DOCUMENTS

| | | |
|---|---|---|
| 2011/0215162 A1 | 9/2011 | Challa et al. |
| 2011/0219448 A1 | 9/2011 | Sreedharan et al. |
| 2011/0227790 A1 | 9/2011 | Li et al. |
| 2011/0282878 A1 | 11/2011 | Bird et al. |
| 2011/0283232 A1 | 11/2011 | Jordan et al. |
| 2011/0288913 A1 | 11/2011 | Waylonis et al. |
| 2011/0289419 A1 | 11/2011 | Yu et al. |
| 2011/0289534 A1 | 11/2011 | Jordan et al. |
| 2011/0295664 A1 | 12/2011 | Flinn et al. |
| 2011/0295665 A1 | 12/2011 | Flinn et al. |
| 2011/0295696 A1 | 12/2011 | Flinn et al. |
| 2011/0295699 A1 | 12/2011 | Flinn et al. |
| 2011/0295703 A1 | 12/2011 | Flinn et al. |
| 2011/0319059 A1 | 12/2011 | Padeh |
| 2011/0321003 A1 | 12/2011 | Doig et al. |
| 2012/0005204 A1 | 1/2012 | Diaz et al. |
| 2012/0011112 A1 | 1/2012 | Bien et al. |
| 2012/0023046 A1 | 1/2012 | Verma et al. |
| 2012/0029986 A1 | 2/2012 | Jalili |
| 2012/0036181 A1 | 2/2012 | Isidore |
| 2012/0038665 A1 | 2/2012 | Strietzel |
| 2012/0130822 A1 | 5/2012 | Patwa et al. |
| 2012/0158502 A1 | 6/2012 | Chung et al. |
| 2012/0166433 A1 | 6/2012 | Tseng |
| 2012/0200390 A1 | 8/2012 | Saravanan |
| 2012/0209839 A1 | 8/2012 | Andrews et al. |
| 2012/0209907 A1 | 8/2012 | Andrews et al. |
| 2012/0316934 A1 | 12/2012 | Zier et al. |
| 2012/0323704 A1 | 12/2012 | Steelberg et al. |
| 2013/0005352 A1 | 1/2013 | Jones et al. |
| 2013/0013416 A1 | 1/2013 | Stein et al. |
| 2013/0018685 A1 | 1/2013 | Parnaby et al. |
| 2013/0018698 A1 | 1/2013 | Parnaby et al. |
| 2013/0018838 A1 | 1/2013 | Parnaby et al. |
| 2013/0018957 A1 | 1/2013 | Parnaby et al. |
| 2013/0024449 A1 | 1/2013 | Chatterji et al. |
| 2013/0047123 A1 | 2/2013 | May et al. |
| 2013/0075464 A1 | 3/2013 | Van Horn et al. |
| 2013/0085847 A1 | 4/2013 | Dyor et al. |
| 2013/0085848 A1 | 4/2013 | Dyor et al. |
| 2013/0085849 A1 | 4/2013 | Dyor et al. |
| 2013/0085855 A1 | 4/2013 | Dyor et al. |
| 2013/0086499 A1 | 4/2013 | Dyor et al. |
| 2013/0117080 A1 | 5/2013 | Madsen et al. |
| 2013/0117098 A1 | 5/2013 | Madsen et al. |
| 2013/0117375 A1 | 5/2013 | Bist et al. |
| 2013/0124628 A1* | 5/2013 | Weerasinghe ............... 709/204 |
| 2013/0132194 A1 | 5/2013 | Rajaram et al. |
| 2013/0132197 A1 | 5/2013 | Toebes et al. |
| 2013/0144710 A1 | 6/2013 | Roundtree et al. |
| 2013/0144711 A1 | 6/2013 | Roundtree et al. |
| 2013/0151339 A1 | 6/2013 | Kim et al. |
| 2013/0159110 A1 | 6/2013 | Rajaram et al. |
| 2013/0161381 A1 | 6/2013 | Roundtree et al. |
| 2013/0167085 A1 | 6/2013 | Roundtree et al. |
| 2013/0191205 A1 | 7/2013 | Harkless, II et al. |
| 2013/0268357 A1 | 10/2013 | Heath |
| 2013/0290106 A1 | 10/2013 | Bradley et al. |
| 2013/0291123 A1 | 10/2013 | Rajkumar et al. |
| 2013/0298147 A1 | 11/2013 | Klein et al. |
| 2013/0326357 A1 | 12/2013 | O'Donnell et al. |
| 2014/0046753 A1 | 2/2014 | Rabii et al. |
| 2014/0052527 A1 | 2/2014 | Roundtree |
| 2014/0067542 A1 | 3/2014 | Everingham |
| 2014/0079225 A1 | 3/2014 | Jarske et al. |
| 2014/0087758 A1 | 3/2014 | Maor et al. |
| 2014/0108142 A1 | 4/2014 | Toebes et al. |
| 2014/0129344 A1 | 5/2014 | Smith et al. |
| 2014/0136606 A1 | 5/2014 | Roundtree |
| 2014/0143250 A1 | 5/2014 | Martin et al. |
| 2014/0176565 A1 | 6/2014 | Adeyoola et al. |
| 2014/0201126 A1 | 7/2014 | Zadeh et al. |
| 2014/0201292 A1 | 7/2014 | Savage et al. |
| 2014/0220883 A1 | 8/2014 | Emigh et al. |
| 2014/0278992 A1 | 9/2014 | Roundtree et al. |
| 2014/0344953 A1 | 11/2014 | Roundtree |
| 2014/0359471 A1 | 12/2014 | Roundtree |
| 2015/0140982 A1 | 5/2015 | Postrel |
| 2015/0181384 A1 | 6/2015 | Mayor et al. |
| 2015/0189028 A1 | 7/2015 | Sayed |
| 2015/0193888 A1 | 7/2015 | Sayed |
| 2015/0242911 A1 | 8/2015 | Zises |
| 2015/0281878 A1 | 10/2015 | Roundtree et al. |

FOREIGN PATENT DOCUMENTS

| | | |
|---|---|---|
| CN | 102073956 A | 5/2011 |
| EP | 2226719 | 9/2010 |
| JP | 63-37727 | 2/1988 |
| JP | 2002261918 A | 9/2002 |
| JP | 2003223251 A | 8/2003 |
| JP | 2006030482 A | 2/2006 |
| WO | 2007035412 A2 | 3/2007 |
| WO | 2007117979 A2 | 10/2007 |
| WO | 2007117980 A2 | 10/2007 |
| WO | 2008110504 A2 | 9/2008 |
| WO | WO-2010018451 | 2/2010 |
| WO | 2010119379 A1 | 10/2010 |
| WO | 2012064860 A1 | 5/2012 |
| WO | 2014186771 A1 | 11/2014 |
| WO | 2015149032 | 10/2015 |

OTHER PUBLICATIONS

International Search Report and Written Opinion for PCT/US2012/68319, Applicant: Nfluence Media, Inc., Mailed Apr. 5, 2013, 21 pages.

International Search Report and Written Opinion for PCT/US2013/32643, Applicant: Nfluence Media, Inc., dated Jun. 7, 2013, 10 pages.

International Search Report and Written Opinion for PCT/US2013/69766, Applicant: Nfluence Media, Inc., dated May 13, 2014, 8 pages.

European Patent Office, Extended European Search Report, EP Patent Application 12797069.7, dated Oct. 2, 2014, 7 pages.

International Searching Authority, International Search Report and Written Opinion, PCT Application PCT/US2014/038502, dated Oct. 7, 2014, 8 pages.

"taxonomy"—www.vocabulary.com/dictionary.taxonomy; accessed on Jun. 4, 2015, 2 pages.

Apple Inc, "UISwipeGestureRecognizer Class Reference", Oct. 6, 2011, 1 page.

Caballini, Andy (Gaia-Matrix), "iBeacons Bible 1,0", Reference 6 in http://en.wikipedia.org/wiki/IBeacon, Jan. 1, 2014, 14 pages.

International Searching Authority, International Search Report and Written Opinion, PCT Patent Application PCT/US2015/023191, dated Jul, 13, 2015, 11 pages.

Japanese Patent Office, Official Action, JP Patent Application 2014-514610, dated Jun. 2, 2016, 9 pages (including English translation).

State Intellectual Property Office of China, First Office Action, CN Patent Application 201280037966, dated Jul. 15, 2016, 22 pages (no English translation).

"A service of measuring location-based public sentiment, in real-time." >http://web.archive.org/web/20110511150225/http://www.qriously.com/>, May 11, 2011, 3 pages.

"Express yourself now, start the quiz . . ." screenshot <youiverse.com>; date unknown 2012; accessed May 15, 2015, 1 page.

"VisualDNA Personality Quiz." <http://you.visualdna.com/quiz/personality>; date unknown 2012; accessed May 15, 2015, 1 page.

"VisualDNA Shops Product Walkthrough"—YouTube. <https://www.youtube.com/watch?v=Uz-IbFmIDY> uploaded May 28, 2009. 1 page.

"What am I worth?" screenshot <http://3.bp.blogspot.com/-UA1s2bthzeE/TxV__cCt_N0I/AAAAAAAACpg/UY-kKxa3k7M/s1600/Worth1.png>; date unknown 2012; accessed May 15, 2015, 1 page.

(56) References Cited

OTHER PUBLICATIONS

Butcher, Mike. "ColourDNA App Builds New Kind of Interest Graph—Pinterest for Color?" <http://techcrunch.com/2012/03/27/colourdna-app-builds-new-kind-of-interest-graph-pinterest-for-color/>. Mar. 27, 2012, 11 pages.
Farmer, Aaron, The Retail Coach. "Psychographic Profile, Retail Trade Area, Liberty, Texas." Feb. 1, 2010, 32 pages.
Gift Finder—Find Gifts by Personality Type. <http://www.gifts.com/finder>; date unknown 2012; accessed May 15, 2015, 1 page.
Mital, Vijay. U.S. Appl. No. 12/759,097, filed Apr. 13, 2010, 56 pages.
Price, E. "Apple Patents the Virtual Page Turn." <http://mashable.com/2012/11/16/apple-page-turn-patent/?utm_source=feedburner&utm_medium=email&utm_campaign=Feed%3A+Mashable+%28Mashable%29[mashable.com]>, Nov. 16, 2012, 2 pages.
VisionCritical. "Vision Critical's Visual Questions: What, when and why to use these question types." Oct. 17, 2011, 44 pages.
VisualDNA Products, "Highly personalized dynamic creative", <http://www.slideshare.net/visualdna/visualdna-products>, published May 3, 2011, 5 pages.
Willcock, Alex. U.S. Appl. No. 11/227,255, filed Sep. 16, 2005, 25 pages.
Willcock, Alex. U.S. Appl. No. 12/294,934, filed Sep. 28, 2008, 182 pages.
"Screen shot of Zite 2.0 application", access date unknown, 5 pages.
U.S. Appl. No. 13/843,270, filed Mar. 15, 2013,124 pages.
U.S. Appl. No. 13/490,444, filed Jun. 6, 2012, 94 pages.
State Intellectual Property Office of China, Second Office Action, CN Patent Application 201280037966.1, dated Apr. 12, 2017, 30 pages.
Roundtree, Brian, U.S. Appl. No. 14/078,515, filed Nov. 12, 2013, "Consumer and Brand Owner Data Management Tools," 66 pages.
Roundtree, Brian. U.S. Appl. No. 14/280,480, filed May 16, 2014, "Privacy Sensitive Persona Management Tools," 82 pages.

* cited by examiner

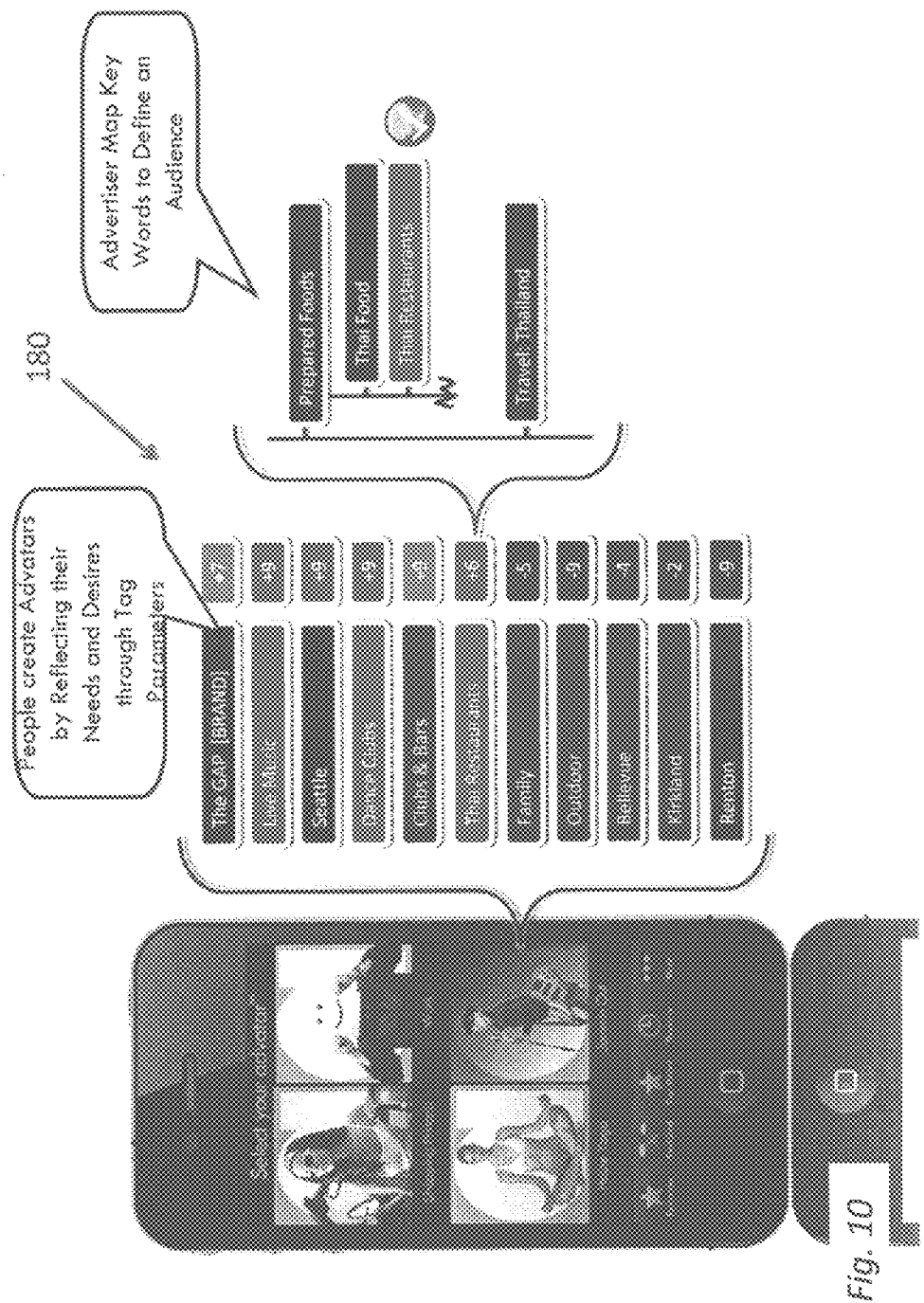

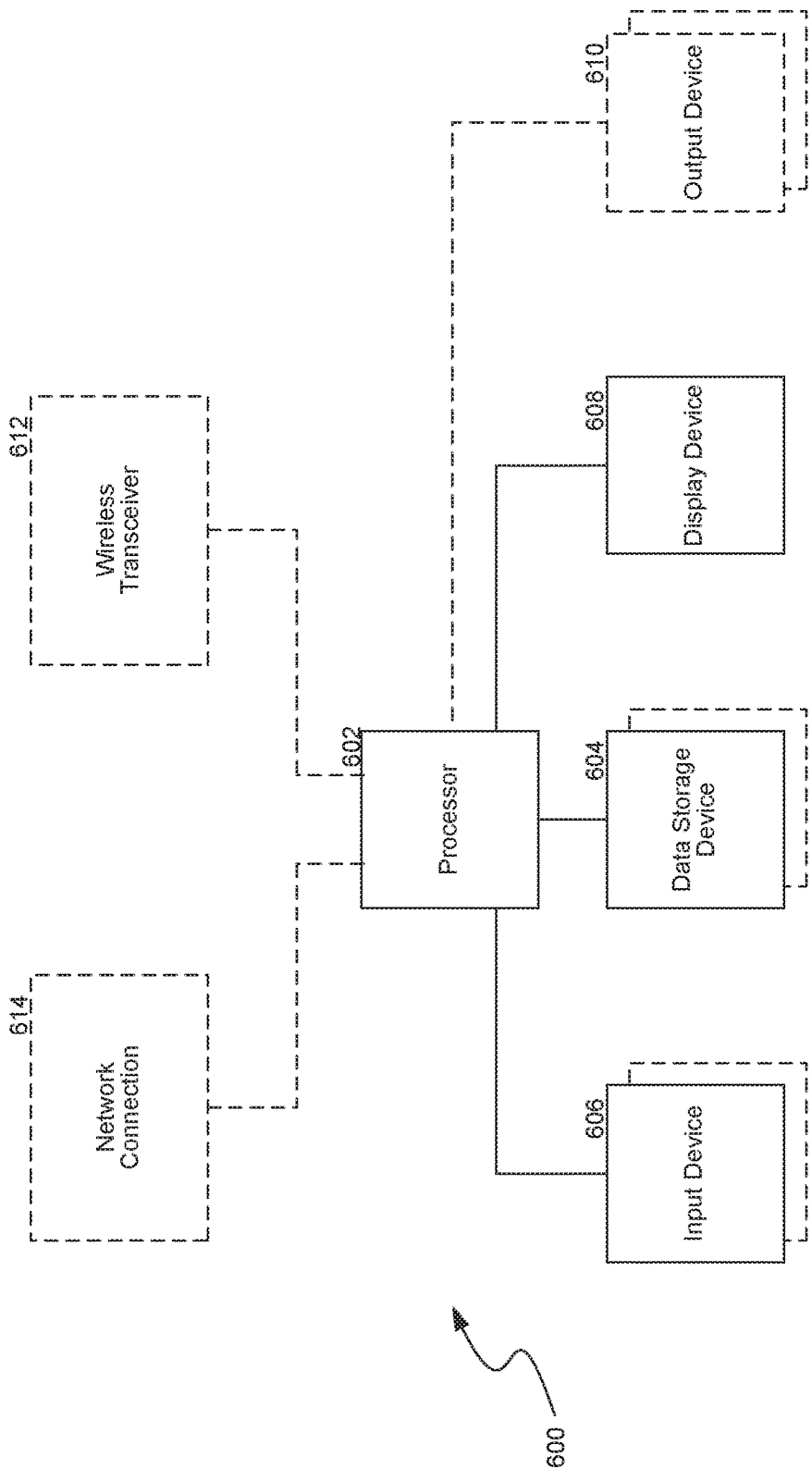

METHOD AND APPARATUS FOR DISPLAYING ADS DIRECTED TO PERSONAS HAVING ASSOCIATED CHARACTERISTICS

CROSS-REFERENCE TO RELATED APPLICATION(S)

This application claims the benefit of and priority to the following U.S. Provisional Patent Application Nos. 61/603,216 filed Feb. 24, 2012; 61/597,136 filed Feb. 9, 2012; 61/567,594 filed Dec. 6, 2011; 61/533,049 filed Sep. 9, 2011; 61/506,601 filed Jul. 11, 2011; and 61/493,965 filed Jun. 6, 2011, each of which is incorporated herein by reference in its entirety.

TECHNICAL FIELD

The present application relates generally to computer systems and in particular to computer-based systems that present advertising to users.

BACKGROUND

The most simple method of advertising involves sending advertisements (hereinafter "ads") to large numbers of potential customers. Such ads can be delivered via print media such as newspapers or magazines or via other channels such as radio, television, e-mail, the Internet and now software applications. The problem with this approach is that a large investment must be made to reach those few customers who may actually purchase the goods or services described in an ad.

To improve their return on investment (ROI), many advertisers endeavor to send targeted ads to selected consumers based on assumed consumer demographics. Demographic companies collect data on individuals based on the purchases they make, surveys they fill out, web sites they visit (behavioral tracking) as well as via other mechanisms. While this approach may lead to a better ROI for advertisers, the result is that consumers often feel that they are being watched and that their privacy is being invaded when they are presented with such targeted ads. In addition, this "data exhaust sniffing" produces poor results in terms of granularity. Specifically, when monitoring a user's activity via a behavioral tracking cookie, nearly every action a user does on her computer as well as what other users do on their computers is tracked. This mass of random uncontextualized information makes inferring granular information very difficult given all the noise.

Given these problems, there is a need for a consumer driven system and method that provides a consumer with a controlled way of collecting demographics and interests that can be connected with an advertiser's targeting goals.

BRIEF DESCRIPTION OF THE DRAWINGS

FIG. 10 illustrates how a selected persona defines a number of likely demographic characteristics that can be selected by advertisers to determine a target audience for advertisements in accordance with an embodiment of the disclosed technology;

FIG. 15 illustrates a block diagram of a user's computing device in accordance with an embodiment of the disclosed technology;

FIG. 16 illustrates one embodiment of a networked computing system used in implementing the disclosed technology;

DETAILED DESCRIPTION

As will be discussed in further detail below, the disclosed technology allows users to create personas (also referred to as "advertars" or "advatars") to serve as a privacy screen or a barrier between a user and advertisers. In addition, the disclosed technology can serve as a tool to segment a user's interests/communications. A persona may be represented as an icon or other symbol that can be selected by a user and has a number of characteristics (e.g. demographic characteristics) associated with it. The demographic characteristics may represent either actual or desired demographic characteristics of the user. The demographic characteristics associated with the personas can be used by advertisers to determine a target audience for one or more ads. In one embodiment, ads are delivered to a persona but the advertiser does know the identity of the user associated with the persona. Users may have more than one persona that can receive ads. More than one persona can be active at any time or one or more of the user's personas may be programmed to become active based on the time of day, location of the user, current activity of the user, and proximity of the user to objects, other users or locations or other factors.

Personas can be created by the user, copied from other users who have defined their personas or adopted from one of a number of predefined personas. In one embodiment, the demographic characteristics attributed to a persona are determined based on responses to the user's indicated opinions such as likes or dislikes of a number of brands. As used herein, characteristics may include the demographic characteristics of a population such as (gender, age, location, marital status etc.) as well as properties, characteristics or traits relating to single individual users such as a user's individual interests.

A. Personas

Figure 1:
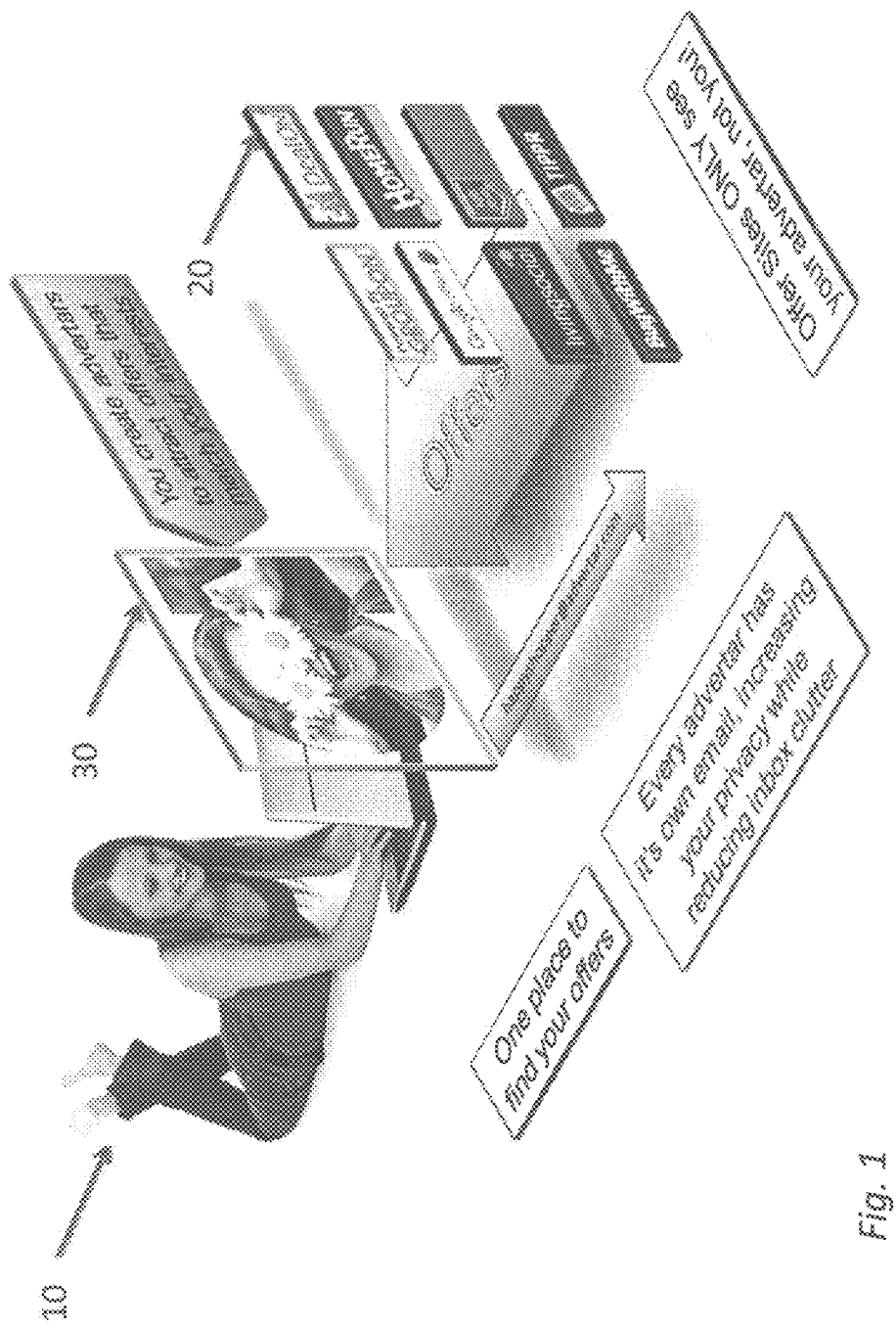
FIG. 1 illustrates a system with which a user uses a computing device to receive advertisements that are directed to a persona that reflects the user's interests and tastes in accordance with an embodiment of the disclosed technology.

FIG. 1 illustrates a user 10 who wishes to receive ads from one or more advertisers 20. The user 10 has selected or created a persona 30 that serves as a privacy barrier or screen between the user 10 and the advertisers 20. Ads are delivered to a logical address, such as to an e-mail address that can be accessed by the user's computing device to receive the ads. In another embodiment, ads are delivered to a server computer (not shown) that forwards the ads to the user's computing device so that the user can receive the ads. The advertisers 20 may not know the identity or other personal information of the user 10 other than the fact that the user's persona has one or more demographic characteristics that indicate that the user may like to receive ads of the type presented by the particular advertiser.

Figure 2:
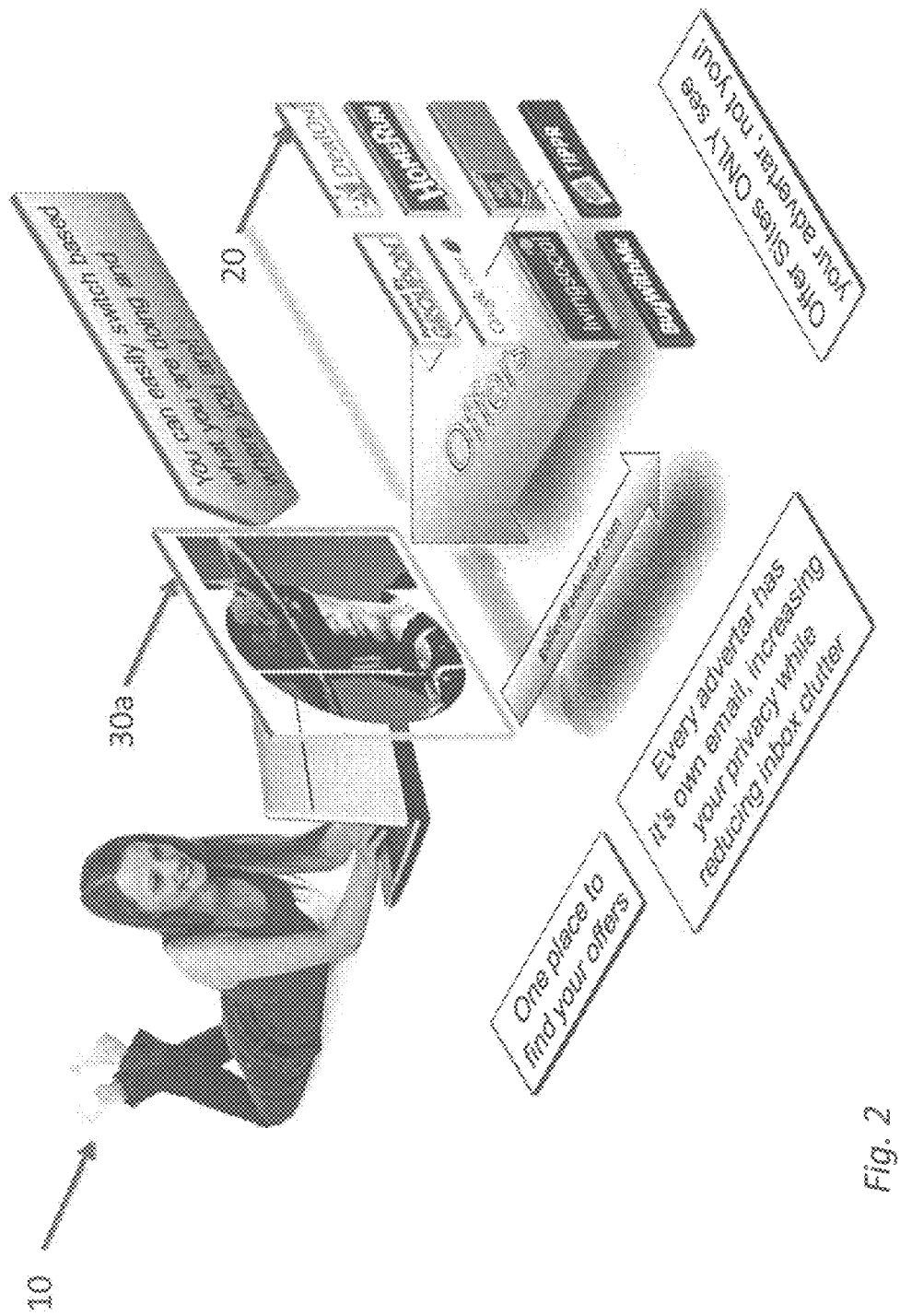
FIG. 2 illustrates a system with which a user can change the persona and receive advertisements that may appeal to a different combination of interests and tastes in accordance with an embodiment of the disclosed technology.

FIG. 2 illustrates how a user 10 may change a persona to a different persona 30a that receives different types of ads from the advertisers 20. The user may have only one persona 30a active at any time or may have more than one persona that that is active to receive ads. Each persona may reflect the user's desire to receive different types of ads directed to each persona. For example, a user may have a persona associated with their job or profession and another persona associated with their hobbies or interests. The personas don't have to reflect the actual demographics of the user. For example, a user who is a bank executive may have a "Work" persona that is defined to receive ads related to financial services or products and another "On Vacation" persona that is defined to receive ads that are likely to appeal to surfers and yet another "Gifting" persona that is defined to receive ads that are likely to appeal as gifts to others and may consider the demographic characteristics of the intended recipient of the gift.

Generally, a user has only one persona that is actively receiving ads at any one time. However, multiple personas can operate at the same time. As will be described in further detail below, the particular persona or personas that are actively receiving ads may be automatically selected based on the time of day, day of the week, location or activity of the user, proximity to other users, calendar items/appointments, holidays, seasons, weather, active applications, events detected by NFCs, advertiser sales, events, announcements, emails/texts/voice mails received, keywords and a number of other factors. In one embodiment, a user may trigger the active persona within a certain distance of a wider geography while receiving ads from only a portion of the wider geography to prevent being overwhelmed with ads. For instance, suppose a user specifies or a persona has learned from inferences from past user input that the user is interested in ads from a suburb of Seattle called Redmond while the user is not interested in surrounding areas of Seattle. Not only can the Redmond persona be activated when the device enters Redmond, but it can be activated upon entering the Seattle Metro area. Upon activation when entering the Seattle Metro area (but before entering Redmond), deals only from Redmond are sent to the user while deals from other areas in the Seattle Metro area are not sent to prevent overwhelming the user. In another embodiment, a persona may deduce from a user's calendar that the user will travel to Redmond. The persona may be activated before arrival so ads may be sent to the user.

In one embodiment, a dynamic icon on a user's home screen can display the currently selected persona. For instance, the home view on an iPhone™ displays icons to mail, phone, camera applications etc. A dynamic icon for a home screen application containing or otherwise interfacing with the persona(s) can display a visual representation indicating the selected persona. This may be through displaying an icon the user has chosen for the persona. Specifically, if a skiing persona is selected, and the user selects a picture, text or other content to represent the persona. The selected picture or other content representing the persona is then displayed on the device home screen.

In a like manner, a persona and functionality discussed herein can be selected and the selected persona content displayed while in a desktop browser interface/IPTV interface etc. An icon or other content representing the currently selected/active persona may be displayed to the user in the tool bar, desktop, browser window or in other locations.

In one embodiment, a persona is implemented as a computer record that represents an address or device identifier to which an advertisement can be directed as well as a number of characteristics (e.g. demographic characteristics) that may be input directly by the user or inferred from user input. The aspects of a persona that can be seen by an advertiser may not identify the identity of the user such that the advertiser cannot contact the user directly other than by the address or device identifier associated with the persona. In one embodiment, a persona has a graphic icon that represents the persona and a number of demographic tags or categories representing the likelihood that the user falls in that demographic category or wishes to receive ads that are directed to people in that demographic category.

In one embodiment, separate cookies and caches are used for each persona when using a web browser or other computing device. This segmentation of persona information prevents information cross over between personas. In addition, this segmentation gives context to the information in the cookies and caches given that all data is related to the persona's interests. This makes optional analysis of such cookies and caches more reliable since the user's activities only pertain to the selected persona. Optionally, the cookies and caches can be encrypted to protect privacy.

Figure 3:
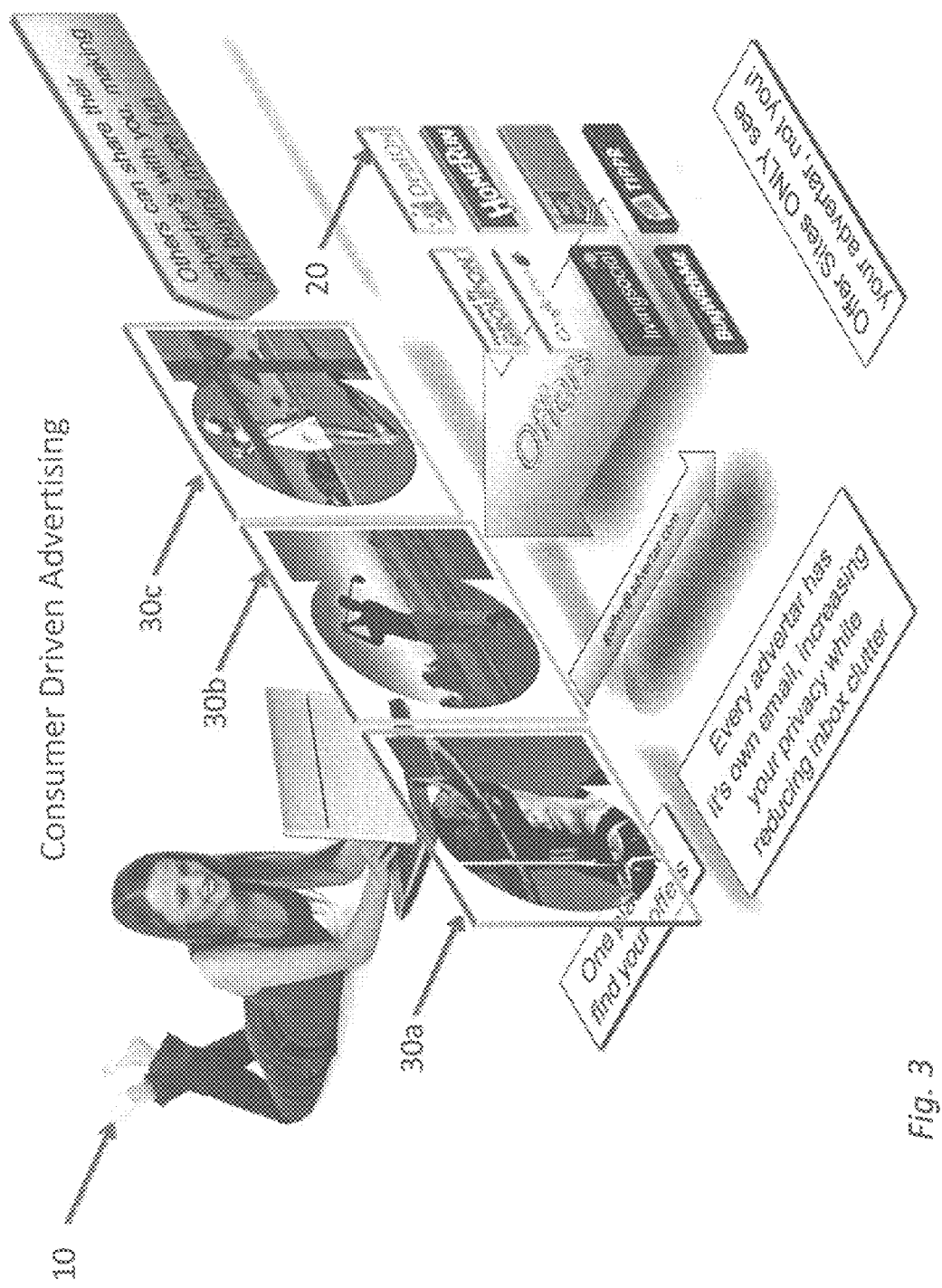
FIG. 3 illustrates a system whereby a user can adopt a persona of others or select a predefined persona and receive advertisements that may appeal to another's combination of interests and tastes in accordance with an embodiment of the disclosed technology.

FIG. 3 illustrates an embodiment where the user 10 may define their own persona 30*a* or may select other personas 30*b*, 30*c* that are created by others or are pre-defined. For example, the persona 30*b* may be defined by an acquaintance of the user who likes golf. The persona 30*c* may be defined by a golfing retailer or club manufacturer for its customers who are interested in its products. Personas can be downloaded from an advertiser's web site, traded on social media web sites, or sent via e-mail or by other forms of electronic communication. Personas can be created/supplemented by taking only certain user selected parts of other personas such as taking only other's persona information by date, affiliations, subject matter, keyword etc.

In one embodiment, personas can be shared by multiple groups of users (e.g. fans) who receive continual updates from the owner/owners of the persona. A persona could be a template in which a user customizes the persona without any updates to the original persona. A persona may be kept entirely private or just certain parts may be restricted to others as will be discussed below.

In one embodiment, a limited persona value sharing enables privacy to gift recipients. This may be useful for a wedding gift registry, which may share imprecise values instead of the values themselves. For instance, the owner of a persona could share that an acceptable dress size for her is in between sizes 8-10 instead of sharing a precise size.

In another embodiment, a user can decline to reveal a numerical range of dress sizes. Instead, the persona can non-publicly store the dress size and check with desired vendors via the Internet to determine if her request dress size is available in the specific dress. Upon confirmation, the gift buyer would merely see that the gift is available but not see the size requested. Upon purchase, the size purchased would typically not be shown to the purchaser to preserve privacy while the correctly sized dress is shipped directly to the recipient.

In other embodiments, sharing precise values is avoided by assigning arbitrary values such as average, below and above average etc. When combining these values, an arbitrary value within the ranges above can be used to arithmetically combine a persona's precise tag values and an average value. In one embodiment, if the range of values is between 1 and 10, an average shared value might be 5, which could be combined with a new value.

Figure 4:
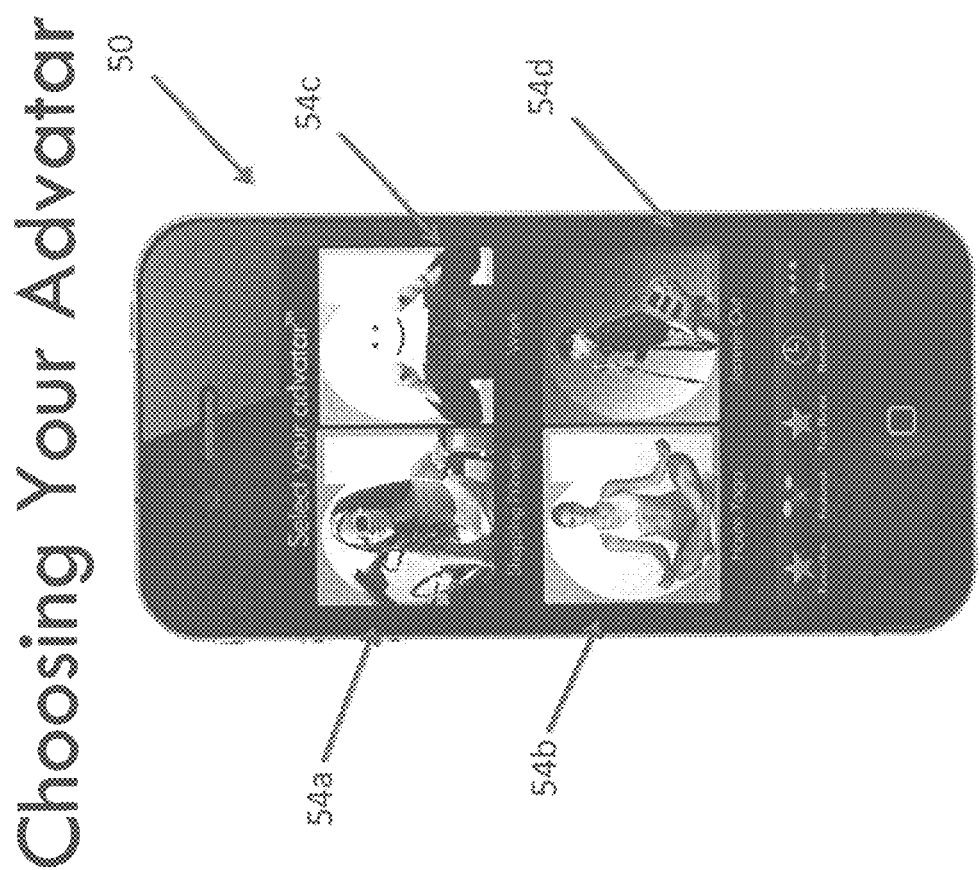
FIG. 4 illustrates a representative user interface screen whereby a user can select one or more personas to receive advertisements.

FIG. 4 illustrates a representative user interface screen 50 produced by an application program running on a user's computing device such a smart phone, tablet computer, laptop, desktop, PDA, book reader, gaming console or other computing device. The interface screen displays a number of graphic icons 54*a*, 54*b*, 54*c*, 54*d* that represent the user's created or selected personas. In the example shown, the icon 54*a* represents a persona titled "Shopping Princess" that is created to receive ads that may appeal to young females who like to shop. The icon 54*b* represents a persona titled "Haute Yoga" and is created to receive ads directed to women who like yoga. The icon 54*c* represents a persona titled "Work" and is created to receive ads directed to the occupation of the user. Finally, the icon 54*d* represents a persona titled "Jammin Out" and is created to receive ads targeted to people with the actual or declared musical tastes of the user.

The user may select one or more of the persona icons 54*a*, 54*b*, 54*c*, and 54*d* to receive ads that are directed to the address or identifier associated with each particular persona. In this way, the user's true identity is shielded by the persona so that advertisers can't determine who the user is but still allows the user to receive ads that are of interest.

As will be explained in further detail below, a persona can be created by providing general demographic data about the user including their likes or dislikes. In yet another embodiment, a user can adopt pre-defined personas such as "Seattle Single Male", "U2 fan" etc. or can adopt celebrity personas that reflect the demographics and likes/dislikes of a particular celebrity.

Figure 5:
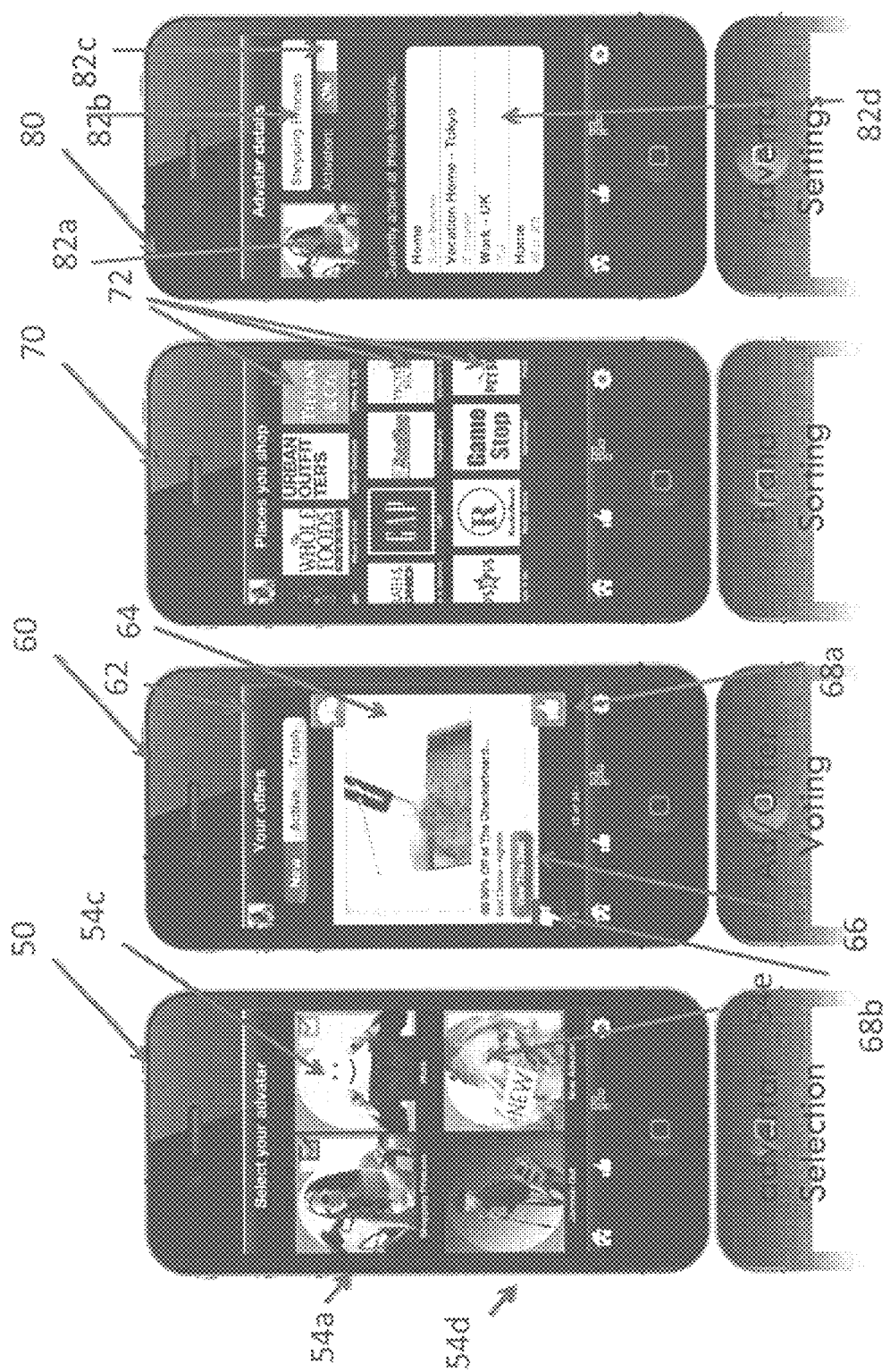
FIG. 5 illustrates a number of representative user interface screens with which a user can select a persona, vote on received advertisements; sort brands to define or refine likely demographic characteristics associated with a persona and define parameters for receiving ads with a persona in accordance with embodiments of the disclosed technology.

FIG. 5 illustrates a number of representative user interface screens 50, 60, 70, 80 with which the user can select, modify and create new personas as well as view received ads and control when a particular persona is active to receive ads. A user interface screen 50 shows a number of icons 54*a*, 54*c* and 54*d* discussed above as well as a new icon 54*e*. Selecting any of the icons 54*a*, 54*c*, and 54*d* activates the corresponding persona to receive ads. Selecting the icon 54*e* starts the process of creating a new persona as will be described below.

A user interface screen 60 has one or more controls 62 that allow the user to view new ads directed to their personas, view active ads that have been previously directed to their personas, see ads that have been shared with other personas or received from other personas and to view ads that have been placed in the trash. An individual ad 64 can be displayed on the user interface screen 60 along with one or more controls 66 that be selected to view more details of the ad. Selecting the control 66 may cause the computing device to open a browser program and direct the browser program to a web site with further details on the ad. Alternatively, selecting the control 66 may request that further information about the ad be sent to the user's computing device. The controls 68a and 68b allow the user to indicate whether they like or dislike the ad being displayed. Depending on which control 68a, 68b is selected (i.e. whether the user likes or dislikes the ad), further refinements may be made to the user's likely demographic characteristics associated with the persona. The controls 68a, 68b may also be programmed to post the ad on a social networking web site with an indication that the user likes or dislikes the ad. In other embodiments, a user can drag an ad she likes up or an ad she dislikes down for fine-tuning her persona as discussed in further detail below. Further functionality such as controls to cause information to be sent to the vendor's ad website, to send the ad to others or to social media can be displayed by tapping the ad which induces the ad to flip around and display the additional functionality and/or additional information.

The user interface screen 70 shows one method of defining a persona by organizing icons 72 on a screen where the icons represent a number of brands. The details of brand sorting to define the demographic characteristics for a persona are discussed in further detail below.

The user interface screen 80 provides a number of controls that allow the user to define details of a selected persona. In the embodiment shown, the controls include an icon selection window 82a whereby the user can change the image associated with a persona. The image can be one of a number of predefined persona images or selected from any available image present on the user's computing device or that can be retrieved from a remote site. A control 82b allows the user to re-name the persona if desired. A control 82c allows the user to activate or de-activate the persona from receiving ads. A control 82d allows the user to define a number of locations or times where the persona will become active to receive ads.

In one embodiment, an application running on the user's computing device receives location information from other sensors (e.g. GPS receiver etc.) on the computing device to determine its location. Which persona is active to receive ads can be based on the user's location. For example, ads directed to golfing may be delivered after it is detected that a user has visited a golf course after a predetermined time, even if a user has not indicated an express interest in golf. Other personas can be activated based on the time of day, such as after work, or on weekends etc. In another embodiment, the detection of a signal from an RFID tag or WIFI transmitter can control which persona is activated. For example, if the user passes a Starbucks™ coffee store and the user's computing device detects a WIFI signal, a user's "Coffee Lover" persona or a persona with a tag that indicates the user likes coffee may be activated to receive and/or request ads for coffee or other products or services offered by the retailer. The controls 82d also allow the user to specify which device or program will be used to retrieve an ad that is directed to the persona (e.g. browser program, gaming computer such as Nintendo Play Station III, Xbox 360 etc.).

B. Persona Creation

Personas can be created in any number of ways. For example, a user can complete a questionnaire by responding to questions regarding the user's gender, age, income level, residence, political affiliation, musical tastes, likes or dislikes (e.g., interest keywords), pieces of content (e.g., pictures) she likes/dislikes and so forth. Such a questionnaire can be provided on a software application (e.g. an app) that runs on a user's computing device or on a designated web site. The answers provided to the questionnaire are converted to one or more likely demographic characteristics that advertisers can use when choosing a target audience for their ads. For example, an advertiser may only want to direct ads to those personas representing single women living near Washington D.C. that have an interest in French fashion and own a cat. Characteristics such as demographic characteristics allow the advertisers to search the personas to find those personas of users that meet the criteria of the advertiser's target audience. Ads can then be sent to the addresses or identifiers associated with each of the personas.

In many instances users find the task of completing a questionnaire about their demographics to be invasive of their privacy and/or too time consuming. In addition, such a questionnaire is often difficult to complete on a mobile device with a relatively small screen. Therefore, in another embodiment, personas are defined in a way that infers the user's demographics based on the user's opinions of (e.g., how the user likes or dislikes) various brands which may supplement or even replace the above techniques of gathering data.

Figure 6:
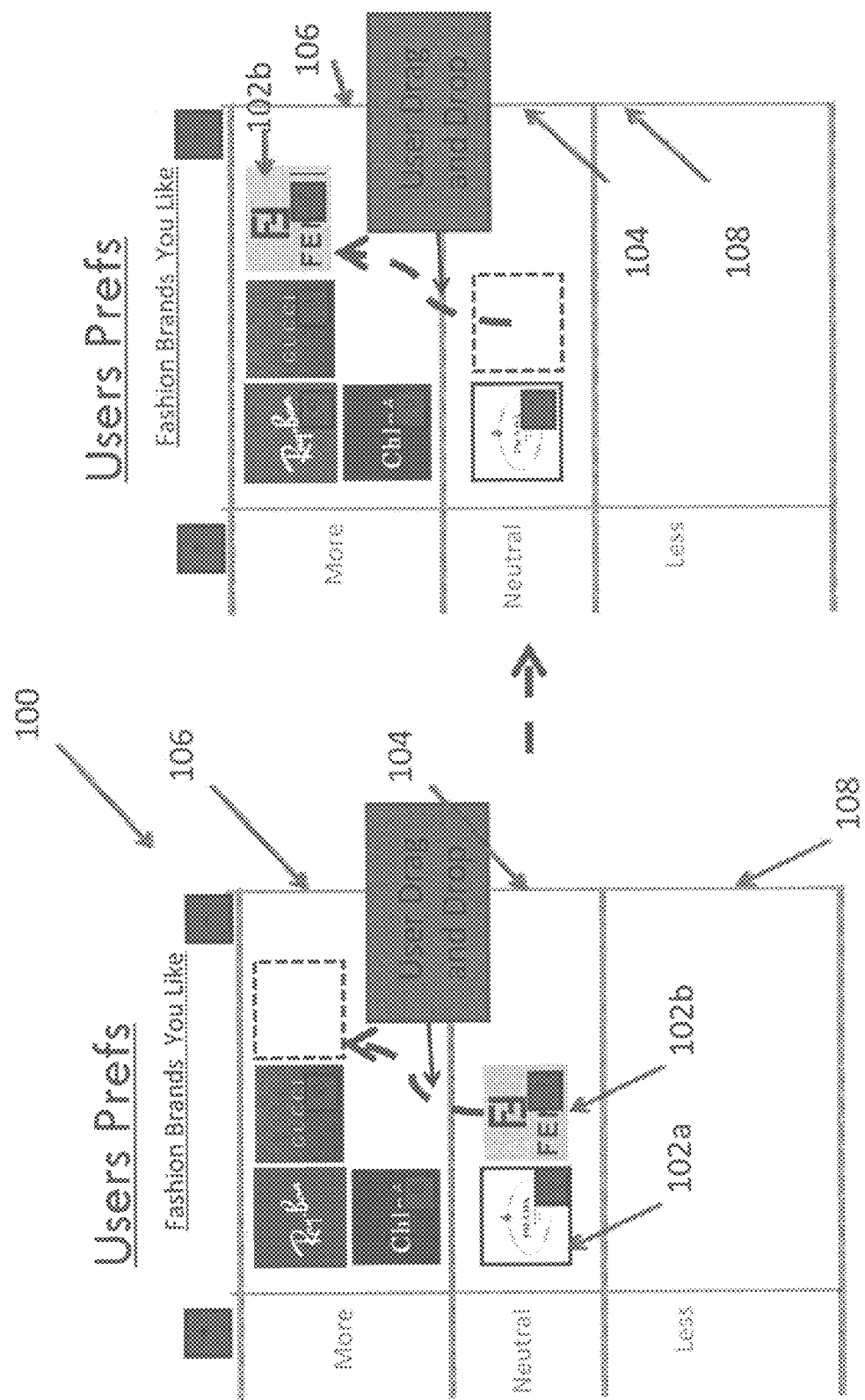
FIG. 6 illustrates one method of allowing a user to sort a number of brands to define likely demographic characteristics for a persona in accordance with an embodiment of the disclosed technology.

FIG. 6 illustrates a method by which a user can indicate their opinion of a brand such as if they like a brand either more or less or feel neutral about the brand. As used herein, an opinion may encompass input from any user interaction with or relating to the brand. Such examples include if a user likes/dislikes, purchase/would not purchase, want/do not want as well as if a user is "following" a brand such as following a brand via Twitter™. In the embodiment shown, a user interface screen 100 displays a number of icons 102a, 102b that represent recognizable consumer brands. In the embodiment shown, the interface screen is divided into three areas. A neutral area 104 represents a neutral feeling about the brand (or unfamiliarity with the brand). An area 106 is an area where the user places icons representing the brands they like more while an area 108 is an area into which the user places the icons that represent the brands they like less. Icons representing a number of brands are initially shown to the user in the neutral area 104. Users can then drag and drop the icons into one of the other areas 106, 108 to indicate that they like the brand more or less respectively.

In one embodiment, various other "like" or affinity tiers such as adding additional tiers can be used to give more granularity to the user's categorization of the brands. In addition, in one embodiment, the icons in the "like" row may be further categorized by a user when icons in the left hand side of the row are interpreted as the user liking them more as opposed to icons appearing on the right hand side of the row or vice versa. In other embodiments, the rows may be replaced by other methods of organizing icons such as piles, vertical columns, buckets or other groupings. Relative affinity for these groupings can be indicated by stacking icons on top of each other, above each other etc. In other embodiments, a user may assign a number or other rating to a brand by various input methods such as typing, selecting options from a menu, accelerometer input, slider bar, speaking, gestures such as finger gestures or Microsoft Kinect™ gestures. In other embodiments, such as displaying brands on phones with HTML 4 browsers on older mobile devices, input may not be possible via gestures. Instead, input of brand opinions may be via a keypad for input into the device or sent via SMS messaging or other means.

In the example shown, a user has selected the icon 102(b) representing the brand "Fendi" from the neutral area 104 and has dropped it into the area 106 in order to indicate that the user likes this brand more. If the user has no opinion of the brand or is neutral about the brand, the user can leave the icon in an area of the screen 104 that groups icons for which no opinion has been expressed. Alternatively, icons representing brands for which no opinion or a neutral opinion is expressed can be removed from the screen and replaced with another icon representing another brand. Based on the opinions of the user to a group of brands, an estimate can be made of the likelihood that the user has one or more demographic characteristics (or would like to receive ads directed to users having those demographic characteristics). In some embodiments, brands that are left or placed in the neutral area of a screen may also be included in determining likely demographic characteristics in a variety of ways. For instance, if a user has relatively consistent neutral/unfamiliar opinion towards upscale brands such as Rolls Royce™ and Saks Fifth Avenue™, it may be inferred that the consumer is neutral/unfamiliar to the brands because her income level is likely not in the range of consumers who are exposed to these brands.

In an embodiment, upon selection of a brand such as an upscale brand (e.g., Rolls Royce) an inference could be made that the user is a high-income user. In response, a subsequent brand sorting screen may be presented with additional upscale brands to confirm the inference and determine other likely upscale demographic characteristics. For instance, if in the subsequent brand sorting screen, a user declined selection or voted down of all of the subsequent upscale brands, then an inference would be made that the user is a "aficionado" of expensive cars, but not a "big spender" across different types of categories such as spas, airplanes etc.

In the example shown, the brands represent known manufacturers or providers of goods or services that the user can buy or use. However for the purposes of the present application, the term "brand" is meant to be interpreted broadly. A brand may include, but is not limited to, a logo, trademark, animation, text, movies, movie clip, movie still, TV shows, books, musical bands or genres, celebrities, historical or religious figures, geographic locations, colors, foods (e.g. packaged foods), flowers, animals, designs, characteristics (young, old, short, tall), emotions (angry, bored), political views, color combinations, shapes, graphics, sounds, movement, smells, tastes, slogans, social media users, personas, patterns, occupations, hobbies or any other thing that can be associated with some demographic information. For instance any thing that can be broadly accepted or recognized by a plurality of users can be a brand. In addition, anything that can identify a seller/product/service as distinct from another can be a brand which may include Huggies™ brand diapers, Copper River Salmon, Microsoft™ software, a picture of Tom Cruise, a picture of a frame from one of Tom Cruise's movies, a musical band name, a musical band album cover, a famous picture such as the picture from Time magazine celebrating victory in WWII in which a sailor is kissing a woman, a picture of a house in the country, a picture of a Porsche™ car, a picture of a smiley face as well as concept brands such as breast cancer awareness or environmentalism etc. In addition, a brand can be an abstract idea such as "World Peace", "Save the Whales", political ideologies such as "Republican" or other concepts about which a user may have an opinion.

In one implementation, each persona is associated with one or more tags representing different characteristics such as different demographic characteristics. The association may be determined via the brand sorting during persona creation. A tag may store or be associated with a value that represents the likelihood (e.g., a probability distribution) that the demographic characteristic represented by the tag is applicable to a user. For instance, the value of the tag may reflect a probability that the user is male while another tag represents the likelihood that the user lives in New York. Other tags may store values that represent the likelihood that the user has children, likes Chinese takeout food, and votes Democratic etc.

Based on the user's indication of their opinion of the brands, such as if each brand is liked or disliked, the tag values can be combined into a composite value that reflects that likelihood that the user has a particular demographic characteristic. As an example, assume that a user indicates that they like Ford brand trucks, Remington brand shotguns and Golden retriever dogs, while another user indicates that they like Barney's of New York brand clothes, Vogue magazine and miniature poodles. Here, the first user likely has a higher probability of being a male than the second user when one compiles the composite values of the probability distributions associated to the gender demographic associated to these brands. A different composite demographic can be associated with the persona created for each user. A user may also reuse composite demographics for multiple personas preventing repetitive entry of opinions. Advertisers then use these determined demographic characteristics to decide which personas should receive their ads. Brands may be selected for presentation to the user for brand sorting based on the likelihood of a user having a certain a certain demographic characteristic. For example, selection of a cosmetic brand X likely indicates a female user in which more brands relevant to females may be presented.

In one embodiment, the composite demographic information is created from the group of brands that are sorted by the user based on her opinions of the brands. In the example shown in FIG. 7, a user indicates that they shop for (e.g. like) brands 1, 2 and 4. The user has indicated that they don't shop for (e.g. don't like) brand 6 and are neutral towards (e.g. don't like or dislike or are unfamiliar with) brands 3, 5, 7, and 8. In one embodiment, the tag values representing the likelihood that a user has a particular demographic characteristic are combined depending on if the brand is liked or disliked. In other embodiments, buy/not buy, would buy/would not buy, use or would use, do not or would not use as well as other opinions or impressions can be presented alone or in combination.

In one embodiment of the disclosed technology, the tags for the brands represent the same demographic characteristic. For example, Tag 1 for all the brands may represent the likelihood that the user is a male between ages 25-40, while Tag 2 may represent the likelihood that the user is a male between ages 40-55. Tag 3 may represent the likelihood that the user is a woman between ages 18-22 etc. Each tag has or is associated with a value representing the likelihood of a user having a defined demographic characteristic. These values for the tags are typically determined from information gathered from consumers who volunteer information about themselves and what brands they like, purchase etc. Such information is typically gathered from marketing data from consumer surveys or a variety of other data sources. The details of associating consumer demographic information with particular brands are considered to be well known to those skilled in marketing. In other embodiments, users may assign a value to a brand by inputting the value itself into the computing device, assigning a relative value to each brand and or tag (brand X given a higher preference to brand Y by giving brand X a location assignment a screen above or to the right of brand Y) etc.

Not every brand may have the same set of tags associated with it. For example Brand 1 does not have a Tag 4, while Brand 2 does not have Tags 2 and 6 and Brand 6 is lacking Tags 3 and 4.

Figure 7:
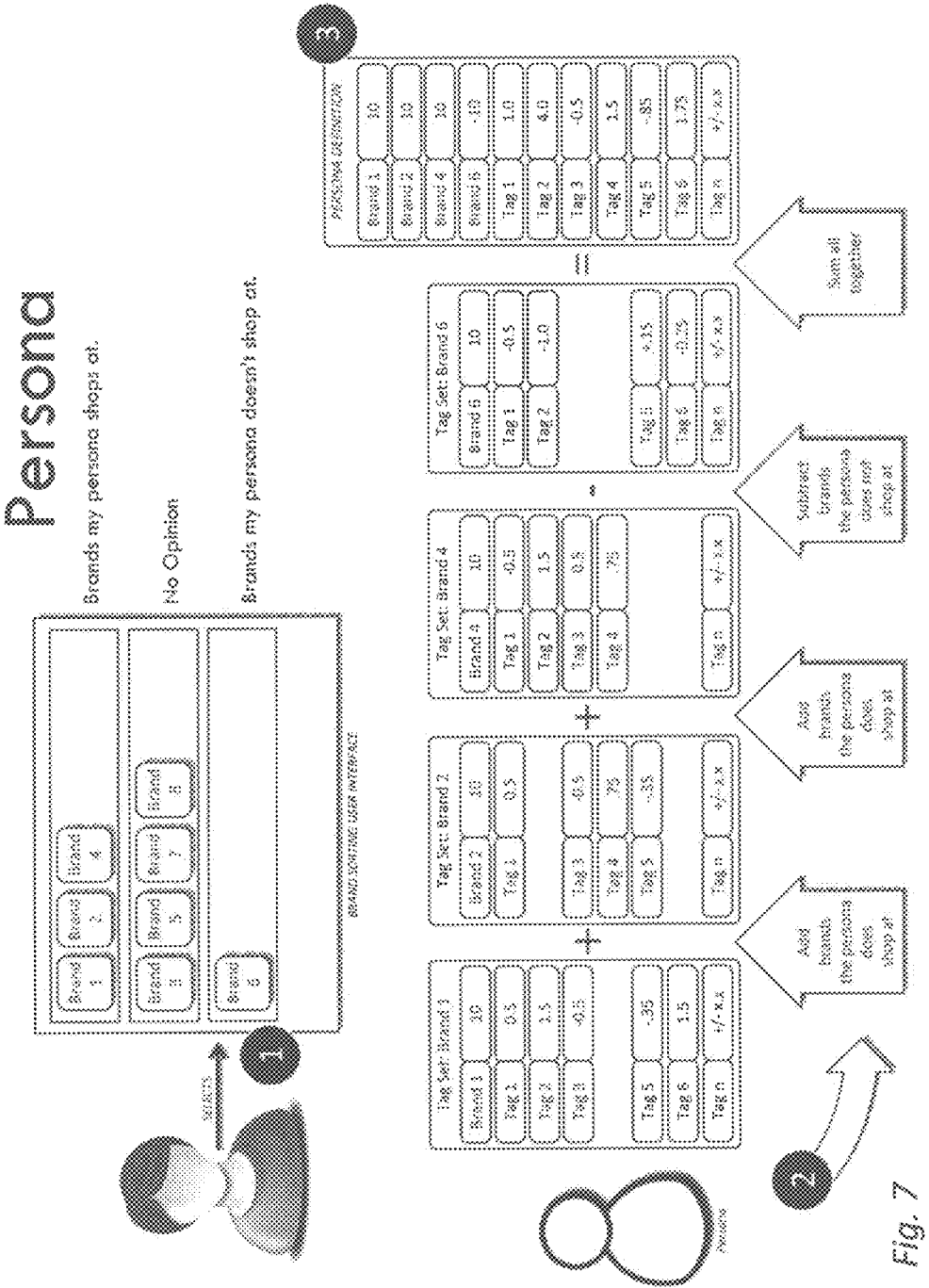
FIG. 7 illustrates one method by which likely demographic characteristics for a persona can be determined based on brand sorting by a user in accordance with an embodiment of the disclosed technology.

In one embodiment, the composite demographic characteristics for a persona are created by arithmetically combining the values of the tags for the liked and disliked brands. In the example shown, Brands 1, 2 and 4 are liked so their tag values are summed while Brand 6 is disliked so its tag values are subtracted. When combined as illustrated, Tag 2 has a summed value of 4.0 (1.5 plus 1.5 minus (−1.0)). A value of 4.0 for a tag may represent a strong likelihood that a user has the demographic characteristic defined by the tag. On the other hand, a tag with a combined value of −2.5 may provide an indication that the user probably does not have the demographic characteristic associated with the tag and an inference can then be made. For example, if a composite gender tag value suggests the user is likely not a male, an inference can be made that the user is a likely female. A composite of the values of the brand tags across the brands (e.g., the sum of statistical probabilities of tag A across brands X to Y as seen in FIG. 7) may also be represented by a vector that is associated with the persona. Each brand tag value in FIG. 7 may be a dimension of the vector.

In one embodiment, based upon the composite demographic characteristics, the corresponding user or persona may be placed into pre-computed demographic segments. Such pre-computed segments are typically determined from marketing survey data. Once the user is assigned to the segment, additional associated characteristics of the pre-computed segment may be associated to the user. In addition, ads that have been specifically designed to target the pre-computed segment may be delivered to the user.

In one embodiment, an ad/offer/content that a persona may be interested in receiving may be matched with the persona based on said persona vector. Typically an ad comes with tags such as coffee, sale, spa, dancing lessons etc. Here, an ad/offer's tag values may be assigned based on marketing data taken from consumer surveys such as a probability distribution that a certain demographic (age, sex, income etc.) would likely desire to receive ads with a given ad tag. The composite of ad tag values represent a vector for the ad. Each of these offer tag values may therefore be considered as an ad vector dimension. In one embodiment, tags related to the ad tags may be assigned along with their associated values to aid in ad-persona matching.

Once a persona is defined, a plurality of ads can be ordered for presentation to the user according to likely persona affinity. By calculating the distance between the persona vector and the ad vector, such as their distances in N tag space, ads can be ranked in order of likely persona desire. The result of this distance calculation may be a ranked list of ads in order of affinity (i.e. the distance between the vectors) for a particular persona vector. In this manner, instead of filtering out ads, a relative ranking of ads is produced. Alternately, other distances between the ad and persona vectors (or any of their components) can be calculated to produce a ranking. Various other methods of ad filtering and ad sorting to match the appropriate ads to the persona may also be used. In some embodiments, location, past purchases, sale times/items, membership in customer loyalty programs, percentage off and other factors may be used to aid in ad ordering/selection. In one embodiment, the calculated affinity for a particular ad is displayed to the user as stars (e.g., an ad with a highly calculated affinity is four our of four stars etc.). In another embodiment, the ordering/filtering may consider the ratio of the geographic distance to an offer and the percentage off. For instance, if an ad is only 10% off and the distance is several hundred miles from the user, this ad would have a lower ordering then an ad that is 90% off and one mile away from the user. Here, the distance and percentage off etc., may be displayed to the user as well. In yet another embodiment, the persona may keep track of ads that resulted in a purchase by the consumer. After a purchase, the user will not be shown the ad on the persona that made a purchase or on all her personas.

Optionally, the dimensions on the persona vector and/or the ad vector can be normalized by multiplying the dimension by a scalar between for instance, zero and one, to prevent particularly strong tag dimensions from skewing the results.

In one embodiment, the composite persona demographic information is determined locally on the user's computing device with which they indicate their preference or opinion regarding various brands. In another embodiment, the opinion information such as like/dislike indications about presented brands are sent to a remote computing device, such a web server that determines the composite persona demographic information. If sent to a remote computer, the remote computer can return a persona back to the user's device.

In some embodiments, a user may not be limited to the binary choice of only indicating that they like or dislike a brand. The user may be presented with controls to indicate that they strongly like or dislike a brand based on a number of discrete levels or using a sliding scale etc.

Other mechanisms for providing an opinion of a brand include increasing the size of the icons that represent liked brands and decreasing the size of brands that are disliked. Brand icons may be stacked or ordered on the screen based how much the user likes or dislikes one brand compared with another. Other organizing arrangements can be devised where liked brands are differentiated from disliked brands. In one embodiment, resized icons may be an indication of affinity after placement in a particular screen area.

Figure 8:
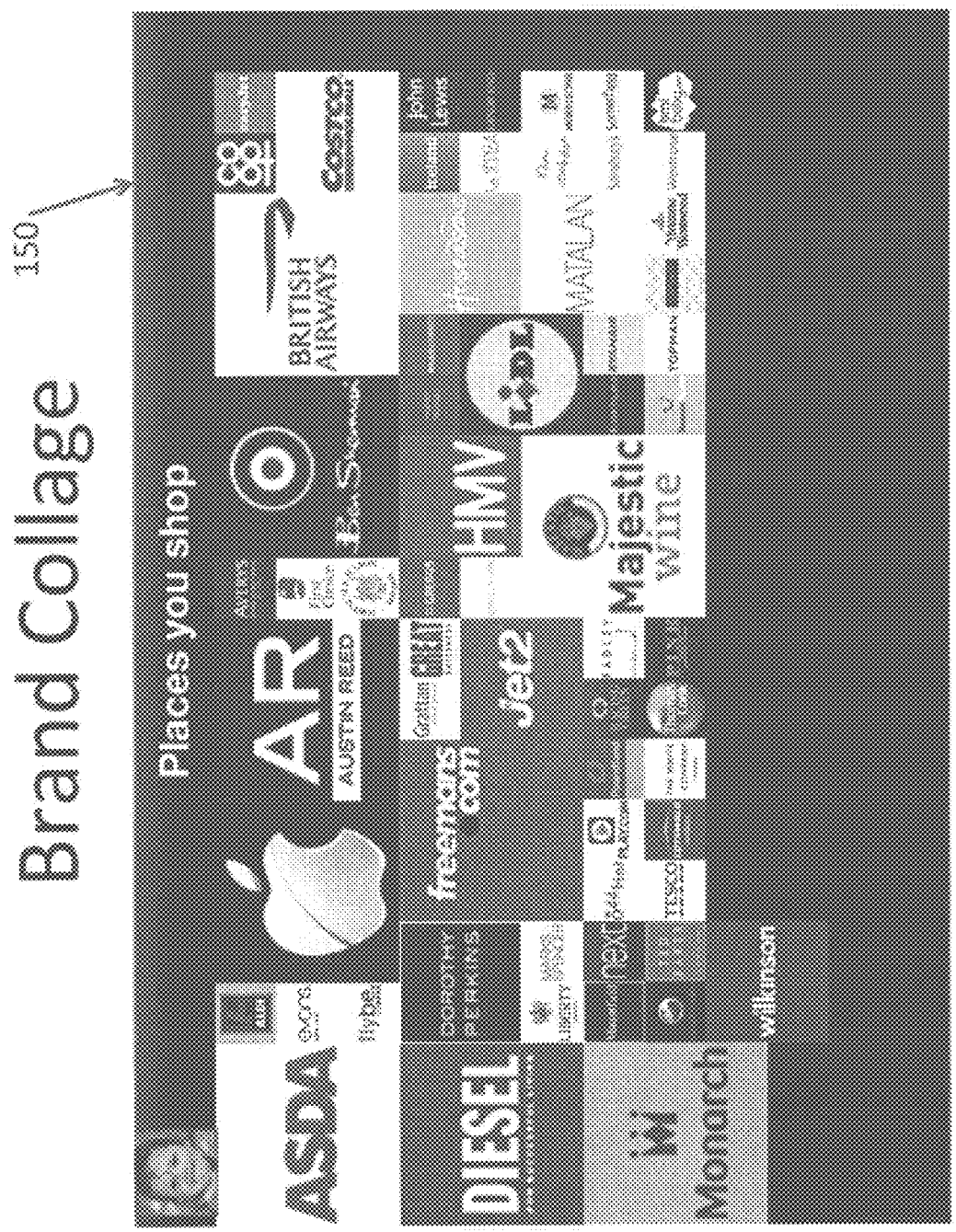
FIG. 8 illustrates a representative user interface screen showing a brand collage associated with a persona in accordance with an embodiment of the disclosed technology.
Figure 9A:
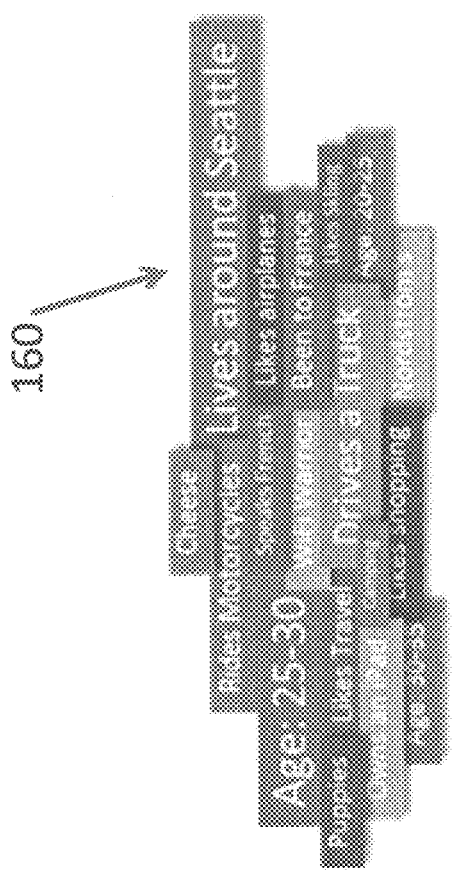
FIG. 9A illustrates a representative word cloud displaying likely demographic characteristics associated with a persona in accordance with an embodiment of the disclosed technology.

Once the user has provided their opinion on several brands, the user can be shown a table, word cloud or other graphic showing the demographic information associated with the persona they have created or are creating. FIG. 8 shows a representative brand collage 150 with the brands that the user likes shown larger than, and/or in front of, or in a different color, orientation to those brands that the user doesn't like: If the user wants to see the demographic characteristics that are assumed based on their brand sorting, the user can see a word cloud 160 of the type shown in FIG. 9A. The word cloud 160 shows the user a grouping of words that reflect the likely demographic characteristics determined from the brand sorting. Some words may be shown larger, in different colors, higher on the screen etc., and in front of other words based on how likely it is that the user has, or desires to be associated with, that particular demographic characteristic.

If the user is happy with their determined demographic information, the user can complete the persona creation process. If the user is not happy with the demographic profile created, e.g. the software thinks the user is a female living in New York but the user is in fact a male living in Dallas, then the user can either edit specific demographic criteria or can rearrange the brands based on different opinions such as like/dislike or provide new opinion information for a different set of brands.

At any time, if the user feels that the persona is not receiving ads that interest the user, the user can edit the demographic information for the persona. This is particularly true if a user adopts a persona of a friend or a celebrity etc. The user may wish to use most of the demographic information associated with the adopted persona but change it slightly to customize the information for the particular user.

Figure 9B:
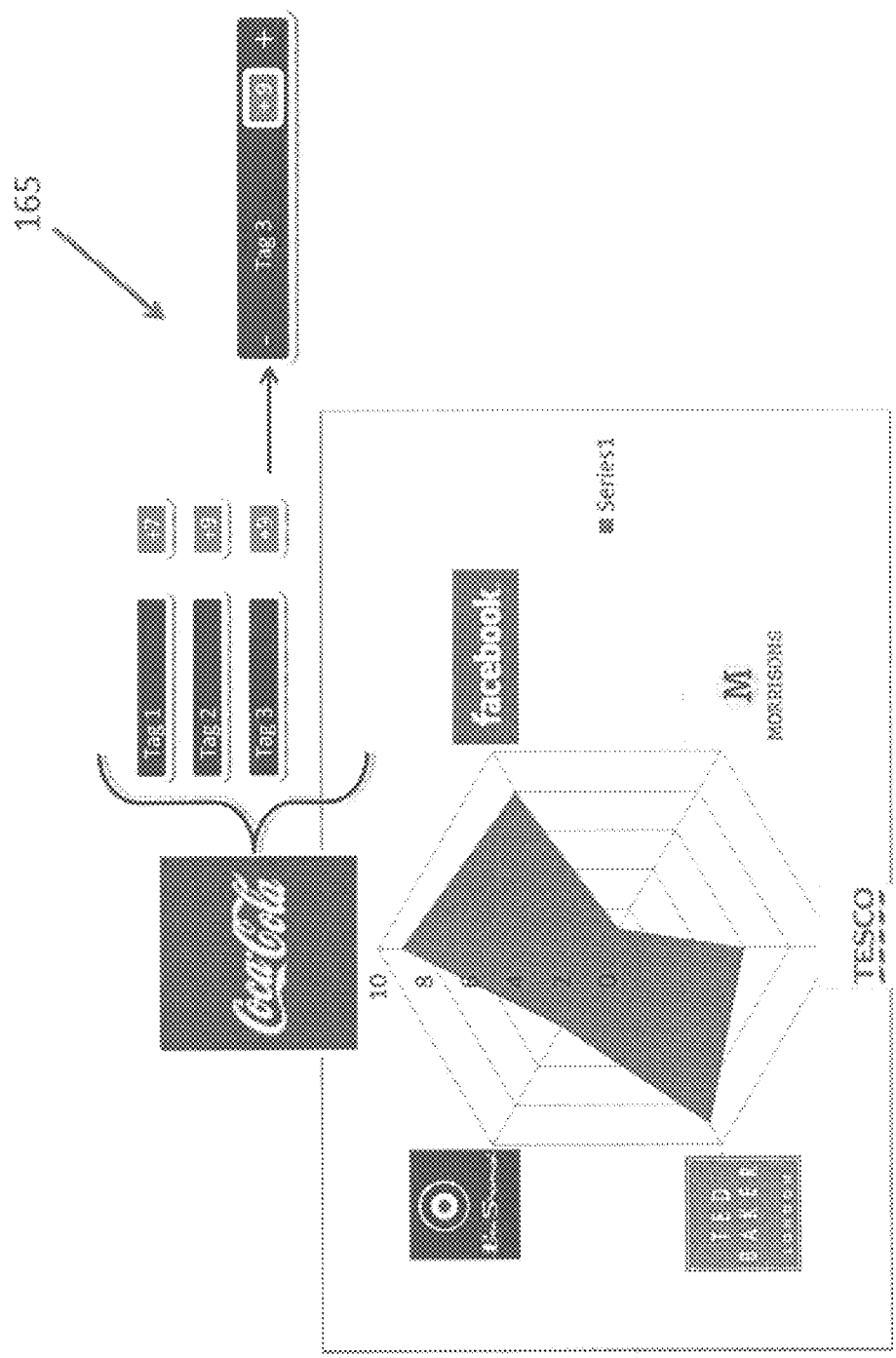
FIG. 9B illustrates a radar graph showing how the opinion of different brands influence the determined demographic characteristics for a persona.

In one embodiment, the brand collage and word cloud discussed above can be supplemented by a radar graph to give the user more insight into her persona. In FIG. 9B, a radar graph 165 illustrates the brands which had the most influence in creating a user's persona and their various contributions. As seen here, Coca-Cola, Ted Baker and Facebook played a larger part with a weight of 8 while Morrisons played a relatively small part with a weight of 2. A user can optionally delete brands, add brands or adjust the contribution of the brands. In another embodiment, tags (e.g., demographic characteristics) can be displayed in place of brands on the graph and tags can be modified as desired.

In this example, the brands such as Coke Cola can be broken down to show their various tags and displayed to the user along with relative values. These values can be optionally adjusted or otherwise modified to the user's liking.

In another embodiment, adjustments to a persona can be done by scanning a QR code related to a brand, inputting pictures, sounds, videos of a brand related data (e.g., taking a picture of a can of Coca-Cola), using or receiving or viewing a brand or related keyword in an email, text or other communication. In yet another embodiment, recording a user's physical location can adjust the selected persona e.g., going to a Nike store and recording the user's location on a mobile device via GPS or other means can be used to supplement a persona with those tag values associated with the corresponding brand and/or adjust the weight of tag values.

C. Audience Selection

In one embodiment, once a user has created or adopted one or more personas, the personas are registered with a server computer that maps a persona to one or more addresses or other identifiers to which ads should be delivered. As discussed above, the address may be an e-mail address, IP address, device id., web site or another logical address that can be used to direct ads to the user.

As shown in FIG. 10, a selected persona defines one or more demographic characteristics 180 (such as interests like That food) that may be of interest to advertisers in selecting a target audience to receive their ads. In the example shown, the persona "Jammin Out" has a +6 value for the tag that reflects an affinity for That restaurants. Advertisers looking for potential customers of That food, That restaurants, and trips to Thailand etc. may search for personas having a relatively high number for this tag in order to select a target audience for their ads.

In addition, FIG. 10 illustrates a taxonomy expanding the user's interest tags. For example, the user has rated That Restaurants a +6. As such, the user would probably be interested in prepared foods in general as well as That foods and perhaps even travel to Thailand. These relationships can be from user survey information. The new tags and associated values can be assimilated into the persona. This expansion of tags provides the user the opportunity to see additional topics, brands, times, locations and other related information. In addition, a user may give feedback on the tag's desirability and associated value.

Figure 11:
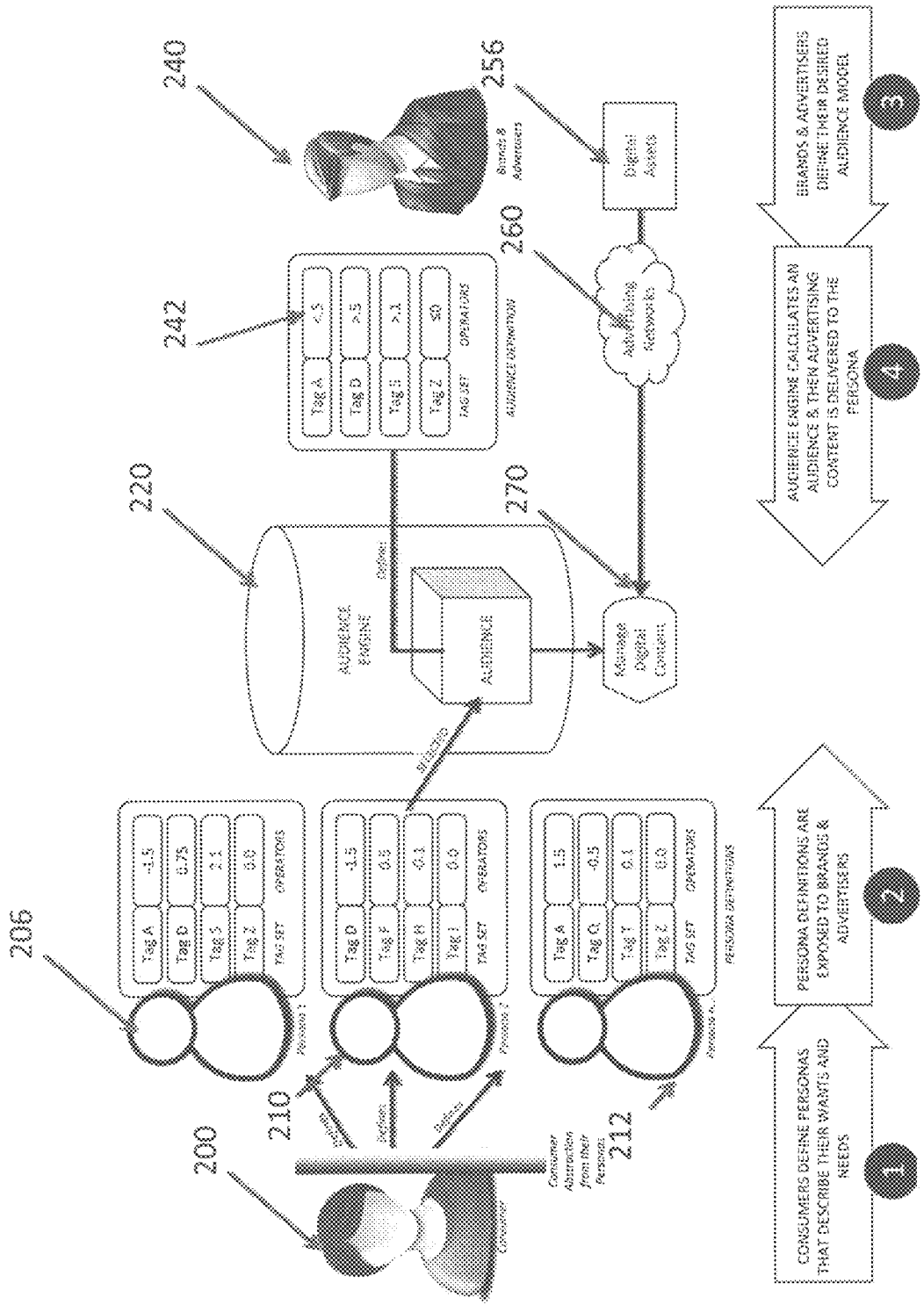
FIG. 11 illustrates one representative method of determining a target audience from the likely demographic characteristics of a number of personas in accordance with an embodiment of the disclosed technology.

FIG. 11 shows further detail of one embodiment of a system for matching tag values for a number of personas with an advertiser's needs for a target audience. In the embodiment shown, a user 200 defines a number of personas 206, 210, 212 each having different tag values that represent different characteristics such as demographic characteristics. The persona information is sent to an audience engine 220 via a wired or wireless computer communication link. The audience engine 220 stores the persona information in a database. An advertiser 240 supplies the audience engine with a list of demographic characteristics such as tags and associated values they want in a target audience. These demographic characteristics are coded manually or with the aid of a computer into one or more tag values 242 or ranges of tag values. The database of personas stored by the audience engine 220 is then searched by the computer system to determine those personas having tag values match all, or as many as possible, of the desired demographic characteristics. Once the personas have been identified, ads 256 are supplied from advertising companies 260 to the audience engine 220 that in turn forwards the ads to the addresses or identifiers associated with the identified personas. Alternatively, third party advertising companies and/or the audience engine 220 may deliver the ads to the personas.

Ads may be displayed to users on the same device on which brand sorting occurred or on multiple different devices. The ads may be shown on these devices within a specified amount of time or upon an event trigger such as proximity to a merchant's store, the start of a sale, another user expressing interest in the ad etc.

In FIG. 11, brands & advertisers can also gather personas from multiple users. These personas can also be processed through steps 1 and 2 in which the yield is similar to the single user persona case but over multiple users. In either case, an advertiser can determine audience or single persona/ user trends, similarities in buying habits, and buying locations etc. Advertisers 240 can get anonymous predictions (without user identity) regarding predictions which are useful in displaying particular customized ads, persona/user interests in ads and associated products, or ordering inventory in anticipation of purchases. Typically an advertiser 240 would be charged a fee by the audience engine 220 for displaying an ad and receiving marketing data pertaining to target audiences. In one embodiment, an advertiser or other party may analyze the persona information to discover and target new audiences.

Audiences and personas may be accessed and transmit data to the audience engine 220 on multiple applications across multiple platforms and devices. Typically each type of these interactions may communicate with the audience engine 220 using an identifier that represents the user's persona. As such, simultaneously use of a single persona may be permitted. Advertisers 240 may be charged for varying access to personas or audiences across various devices, platforms and applications. For instance, an advertiser may be only permitted and thus only charged to access certain personas in an audience using an iPhone™ or access can be restricted to audiences using certain iPhone applications.

In one embodiment, the audience engine 220 tracks the active time a user spends on each persona, actions/choices/ votes/location/sharing of ads of the persona, ads voted on, purchases, click-thrus, impressions, advertising effectiveness, which application was used with the persona and which device(s) was used with the persona. This tracking may be confidential and not revealed to third parties without consumer permission. The user may be offered a reward such as money, points, gift cards in return for sharing this or other data. In another embodiment, the user may chose to share this data with selected personas owned by others or herself which results in a real-time sharing of her actions.

In one embodiment, the demographic information associated with a persona is refined depending on how the user reacts to ads delivered to the persona or previous brand sortings. For example, if the user indicates that they do not like an ad, one or more tag values associated with the persona may be adjusted. In this way a persona's determined demographic characteristics can be continually improved or updated. In one embodiment, ads can be shown as icons and displayed and assigned affinity/voted on in a manner similar to how brands are sorted as illustrated in FIG. 6. Answers such as "like the ad" "neutral" and "dislike the ad", a picture of a "thumbs up" and "thumbs down" may be displayed on various screen areas so the user may know where to drag the icons to and thereby assign affinity to the ad.

In one embodiment, the feedback from user assigned ad affinity may make very granular adjustments to a persona. In one embodiment, a simple vote on an ad may modify a plurality of aspects of a persona by considering the specific tag, subcategory tag and associated weights among other things. For example, an ad was voted "thumbs up" and the ad had the following tags and associated values: car=1, car/Ford=0.2 and car/Toyota=−1 wherein car is a category tag and Ford and Toyota are subcategory tags. The persona could be modified in a plurality of ways. First, the persona would favor these tags and subcategory tags in a greater absolute magnitude than if the ad was voted "thumbs down". This prevents undue voting down because users are more expressive about things they like as opposed to things they don't like. Second, a variety of tuning factors may be applied to the tags "car" or subcategory tags "Ford" and "Toyota". For example, categories may not all be weighted equally. In one example, categories may be weighted differently for different cultures. For instance, the automobile category may receive a higher weight in US culture as opposed to cultures where automobile ownership is lower.

If an ad was assigned a negative affinity, the tag and associated values may play a lessor role in assigning ads in the future. In one embodiment, no ads with those tags or related tags might be shown to the user. In another embodiment, ads with these tags and related tags might be decreased but reintroduced to the user at a gradual rate to ensure the user does not permanently omit herself from exposure. In another embodiment, the ads with said tags and related tags simply have their weights reduced accordingly. Similar approaches to the above can be applied to brand sorting.

D. System for Delivering Ads to Personas

Figure 12:
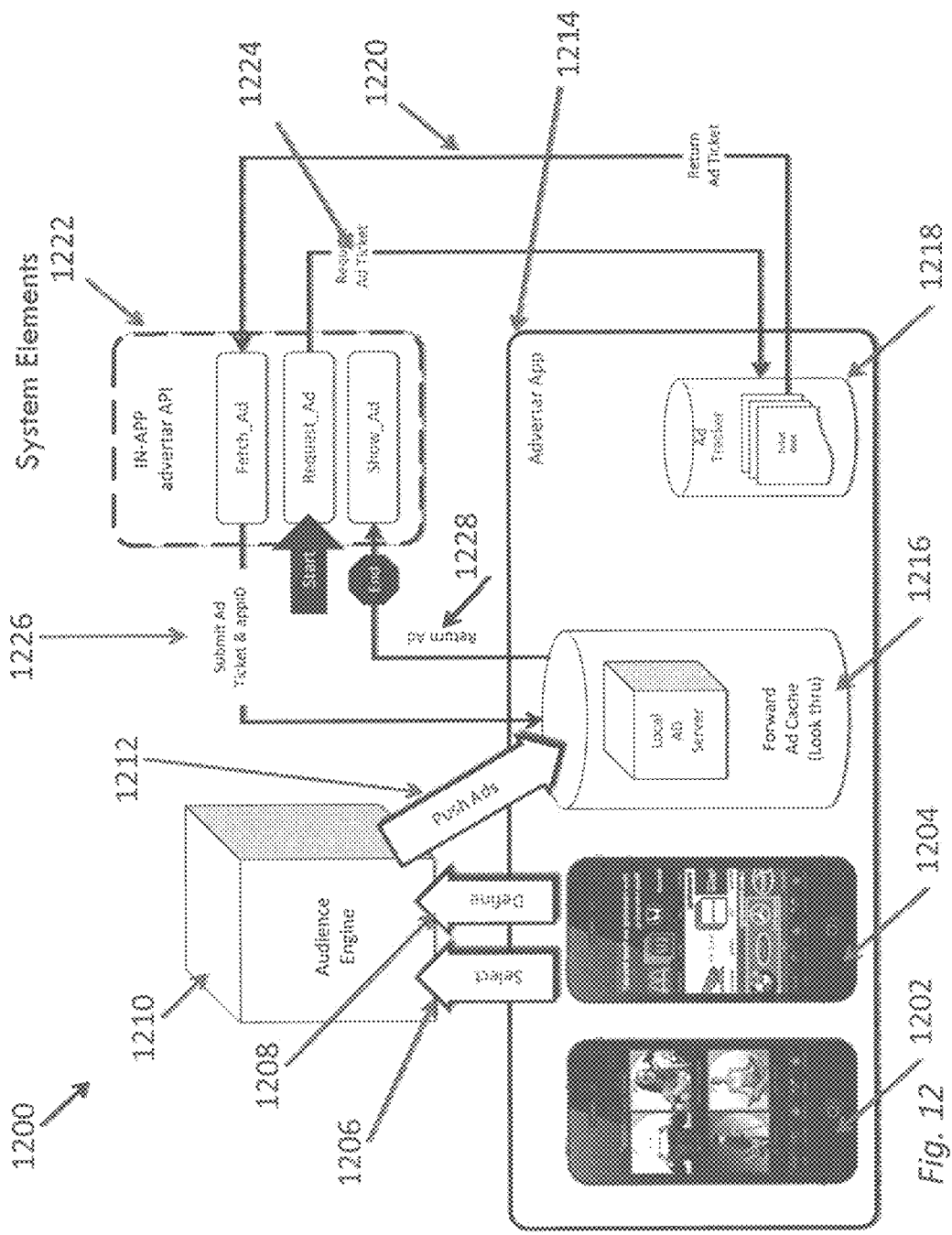
FIG. 12 illustrates one embodiment of a system for delivering advertisements to a user's computing device in accordance with the disclosed technology.

FIG. 12 illustrates an exemplary system 1200 for creating personas and ad serving to a persona on a computing device. As used herein, the term "ad" is to be interpreted broadly and can include promotional materials, rebates, consumer notices, content, political or religious materials, coupons, advertisements (including push advertisements), various kinds of recommendations (such as product/service recommendations, content/media recommendations), offers, content (movies/TV shows) and other information that a user may which to receive. At 1202 a mobile device is shown. On the screen are images representing four personas tied to a single account. A user may optionally register the account under any identifier including an email address. In one embodiment, the email address is one way hashed and discarded after the hash. The hash is optionally stored by the audience engine and serves as an identifier. This prevents the storage of user's identifying information on non-user devices and enables the user to have an identifier in case she forgets her password etc. In another embodiment, only one persona is created and no identifier is asked from the user. Instead, a software install ID or other identifier is used to identify the persona.

A persona may be created by optionally choosing a name for the persona, associated interests/keywords (e.g. to help focus ad searches), social media accounts to tie the persona to and active locations/times the persona should be active among other parameters. Then, a brand sorting screen may be displayed at 1204. Upon sorting a number of brands, at 1206 and 1208 the brands that define the persona are transmitted to an audience engine 1210, which may be on a remote server.

The persona's demographic characteristics are matched with ads, offers, coupons, services, products, content recommendations or other similar things. Typically, the audience engine 1210 is in communication with a third party ad server and/or ad bidding system (not shown). The ads may be pre-downloaded to the audience engine 1210 and analyzed. Analysis may be performed by assigning tags and associating statistical probabilities that particular demographics would be interested in the ads or assigning probabilities to existing tags or other data related to the ad. The ads are then optionally ordered in relevance to the characteristics of a particular persona's vector as previously discussed. Here, in response to the persona creation, a plurality of ads are pushed to the mobile device at 1212 from the audience engine 1210. The ads are pushed into a local ad server 1216 on the user's computing device. Here the local ad server is within the application 1214 that created the persona. Within the application 1214, is an ad tracker 1218 with a ticket book. Each ticket may be used to request an ad from an in-application persona API 1222. In one embodiment, a ticket may contain information to display an ad to one or more personas and/or to different devices or applications associated with the persona.

The request for an ad may occur upon a user or a software request or on the occurrence of an event such as an arrival of the device at a physical location, keyword in communication, predetermined by an advertiser, event on a calendar, time of a TV show, a triggering event such as visiting a website, date of a product sale etc. API 1222 may start the ad request at 1224, which is transmitted to ad tracker 1218. Ad tracker 1218 returns a return ad ticket at 1220 to API 1222. API 1222 then submits the ad ticket and application ID at 1226 to the local ad server 1216. The local ad server then displays the ad on the device or other connected devices at 1228. In one embodiment, the application ID at 1226 can be directed toward other applications on a plurality of connected devices in order for an ad to be shown on other devices. Optionally, upon display of the ad, at 1226 a request can be made to a connected device to display other content such as a website related to the displayed ad or the ad itself on other devices.

Figure 13:
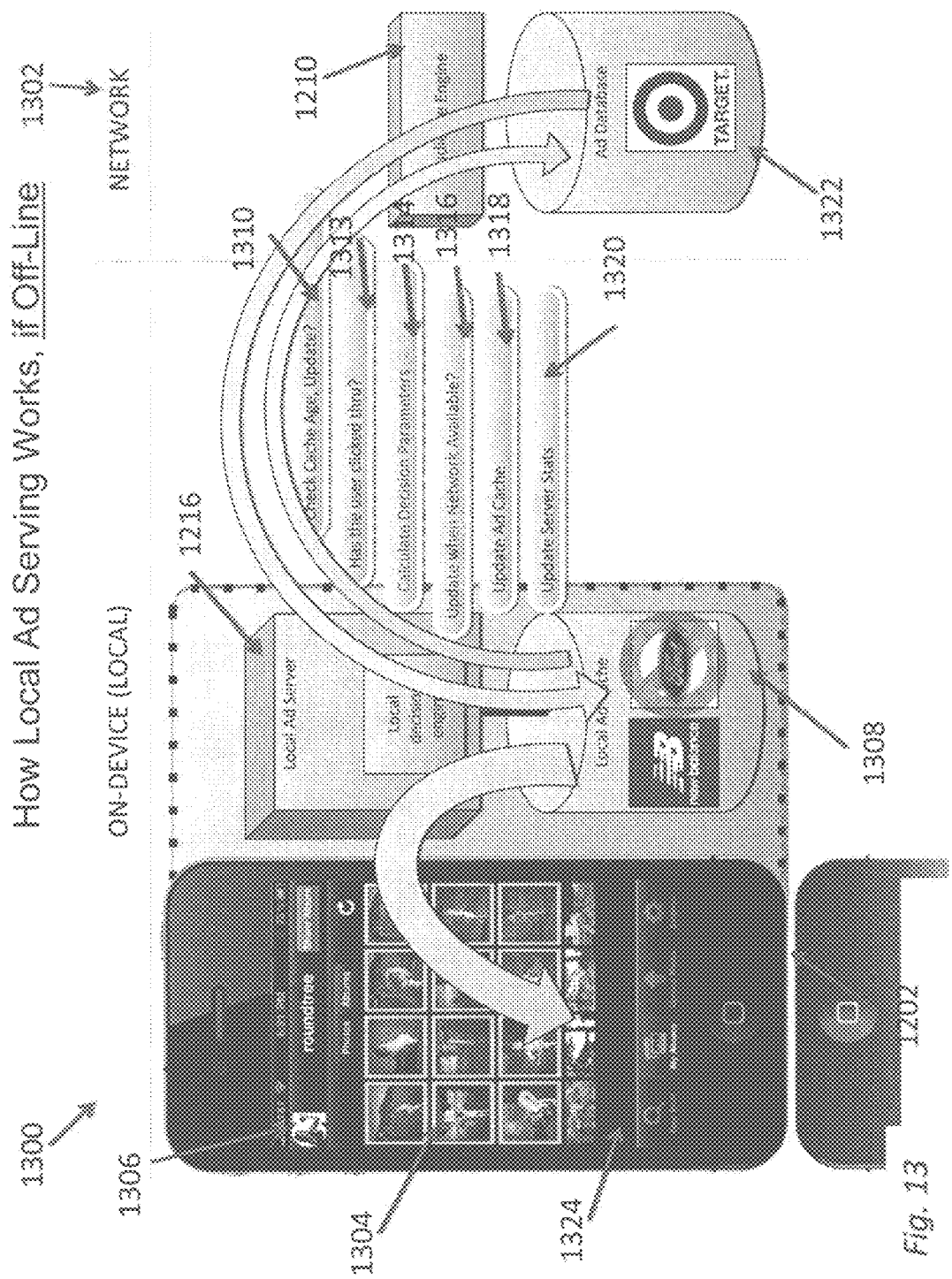
FIG. 13 illustrates one system for displaying advertisements on a user's computing device if the computing device is off-line.

FIG. 13 shows an embodiment of a method 1300 of ad serving while a device is off-line. This method is useful if communication to other devices is limited or non-existent for a time. This method provides access to a number of ads regardless of communication access.

At 1302 a network is connected to a device 1304 after a persona is created. 1306 shows the active persona icon in an application for picture viewing. In this embodiment, the persona was created in a different application but interfaces with this picture viewing application to display ads via a persona identifier. Within the device 1304 either in the photo viewing application, in the operating system or within another application or even remotely, lies the local ad server 1216 and local ad cache 1308 which may exist with the local ad server 1216 or elsewhere.

Upon desired times or actions, local ad server 1216 takes a series of operations. At 1310, the local ad server 1216 checks an ad database 1322 to see if any ads need to be downloaded or need to be updated based on merchant inventory, sale, user persona changes etc. At 1313, ads on the device and optionally remote ads are analyzed to see if the user had clicked through them. Decision parameters at 1314 can be considered to determine if ads need to be downloaded. Additional ads maybe downloaded/updated if the network 1302 is available at 1316. At 1318 and 1320, the ad caches maybe updated and server stats may be updated to give feedback regarding what the user had clicked though/voted on and any persona changes that may influence which ads are downloaded. This may be via audience engine 1210 or other servers.

These steps serve to create a cache of ads that are updated for the persona according to varying conditions. When offline, the ads may be presented to the user in a similar manner to that shown in FIG. 12. At 1324, ads may be displayed to the user once the ads are updated. Here, an ad is shown as a banner ad below photos within a photo sorting application due to the associated ticket specified for this particular application ID. In this particular embodiment, the ad shown in this application may be displayed in response to the content of the pictures in the application such as tags, facial recognition, GPS coordinates of a picture in addition to time of a sale mentioned in the ad, location of the device, location of the ad, keyword in a communication etc.

In some embodiments, the ads themselves may include specific triggering events for display specific to each ad such as the offer time of an ad etc.

E. Masking User Identity

Figure 14:
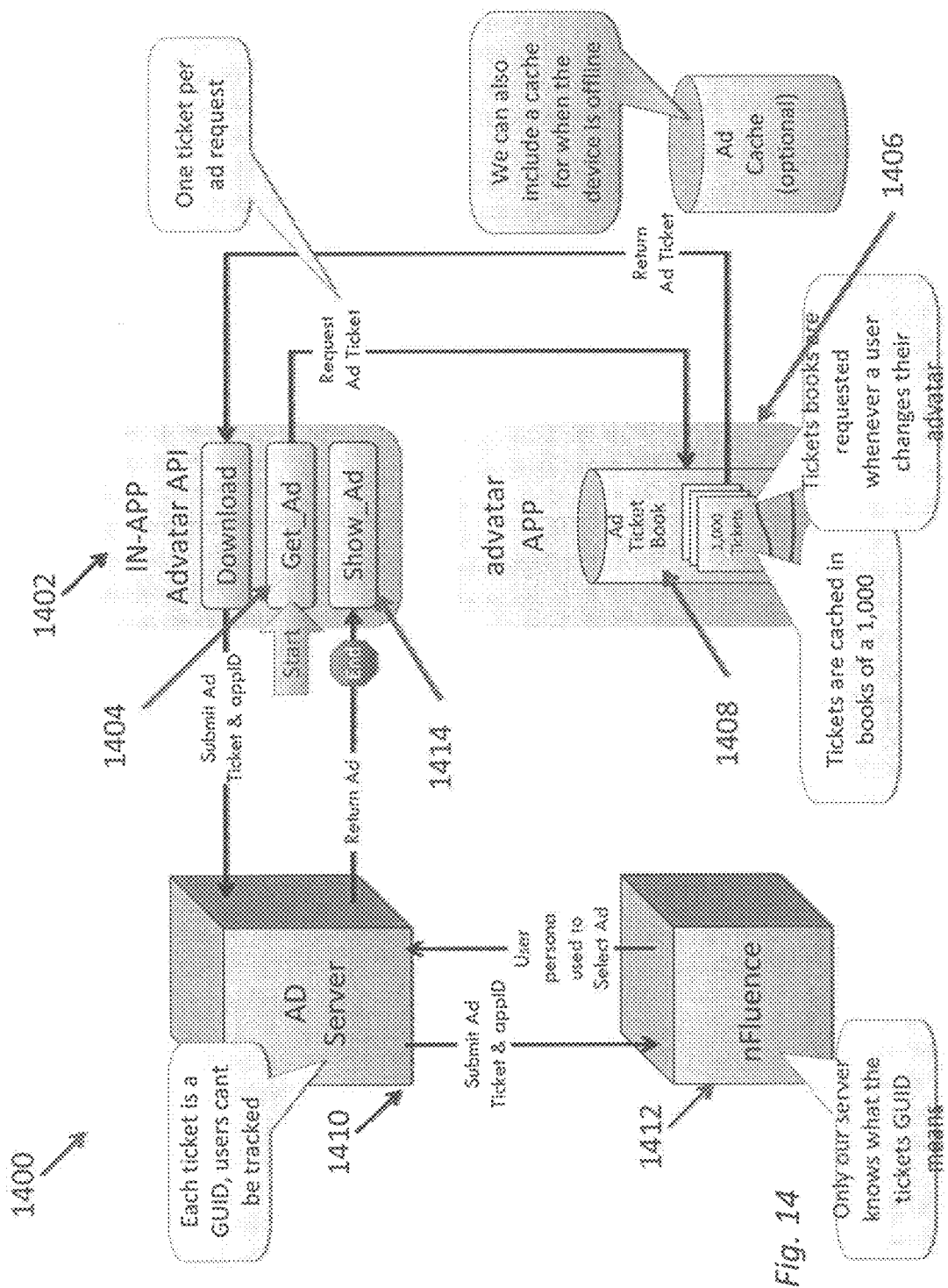
FIG. 14 illustrates further detail of a system for selecting and delivering advertisements to a user's computing device in accordance with an embodiment of the disclosed technology.
Figure 9:
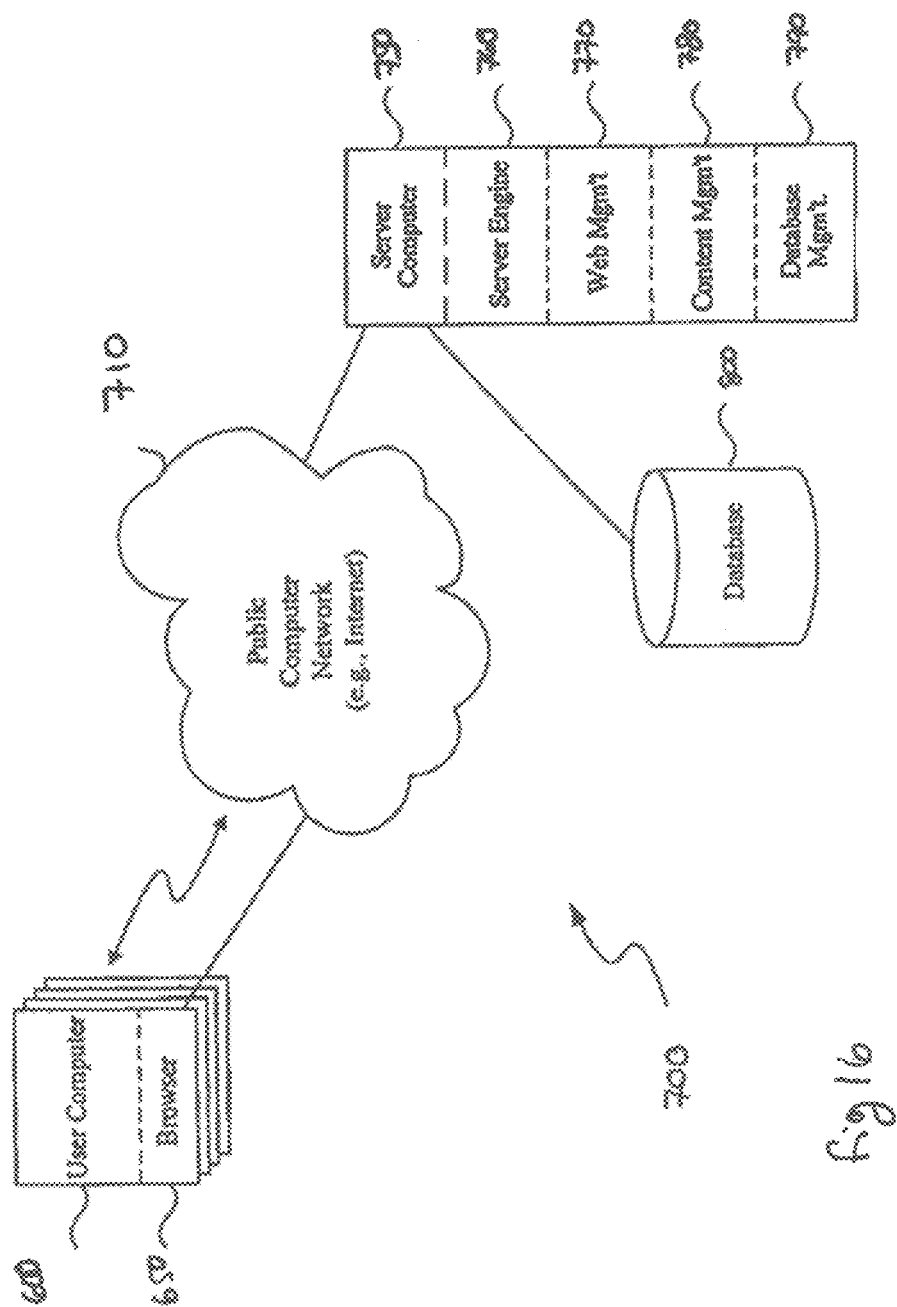

FIG. 14 illustrates a system 1400 in which a user's identity can be protected from being discovered during persona advertising. In one embodiment, a GUID or other non-traceable ID, such as a software install ID, is assigned to each user/persona and this information is optionally associated with an IP address as the only information shared with advertisers etc. At each exposure point, a new GUID may be assigned to prevent identity triangulation. In one embodiment, GUIDs are automatically changed even on the same visit at every exposure point for added privacy.

At the start operation, the in-app Advatar (persona) 1402 (typically stored on the user's device within an application) has a Get_Ad 1404 software module which requests a ticket (each ticket may contain a different GUID(s)) from an Advatar app 1406 on any desired device connected to a network. The Advatar app may cache a plurality of tickets in an ad ticket book 1408. The in-app Advatar 1402 is designed to request/receive and display ads via tickets and optionally designed to accept persona feedback on an ad and the persona's actions.

The ticket requested by the in-app Advatar 1402 is sent from the Advatar app 1406 to the in-app Advatar 1402 with which the ticket is then associated with an application ID. The application ID is then sent to an advertiser's ad server 1410, an ad exchange or real time bidding system. In one embodiment, different tickets may optionally correspond to tickets to show different personas ads. From there, the ad ticket and appID is passed to a secure third party server (e.g., audience engine) 1412 in which this sever, and optionally not the advertiser's server, knows what the ticket GUID means in terms of the user's identity or other sensitive information e.g., profile etc. Another use of the GUID is that users may appear simultaneously as different GUIDs on different devices in a secure manner. For example, advertising server A would see the GUID as 1234 and the same user is seen on advertising server B as user GUID 4567 but only the server 1412 would be able to determine the true identity of the user. The apparent GUID may even change periodically while accessing the same website (server 1412 will periodically assign a new GUID). The secure third party server 1412 would coordinate the information with the correct master ID as only it knows the corresponding GUIDs and identity/persona information. This protects the user from unwanted contact from advertisers such as SPAM as the advertiser has no email or other personally identifiable information. Although in one embodiment, the ad server 1410 has the user's IP address in order to return an appropriate ad to the persona.

Given the persona profile on the secure third party server 1412, an appropriate ad or kind of ad is determined. The appropriate type of ad is then communicated to ad server 1410. The advertiser's server 1410 then forwards the appropriate ad determined by the secure third party server 1412 to the in-app Advatar 1402 via an IP address that the in-app is hosted on. Once at Advatar 1402 a Show_Ad module 1414 then displays or caches the ad for later display. Various other software embodiments are contemplated for masking a user's identity.

F. Other Embodiments

1. Multi-Device and Multi-Persona Interactivity

Figure 20:
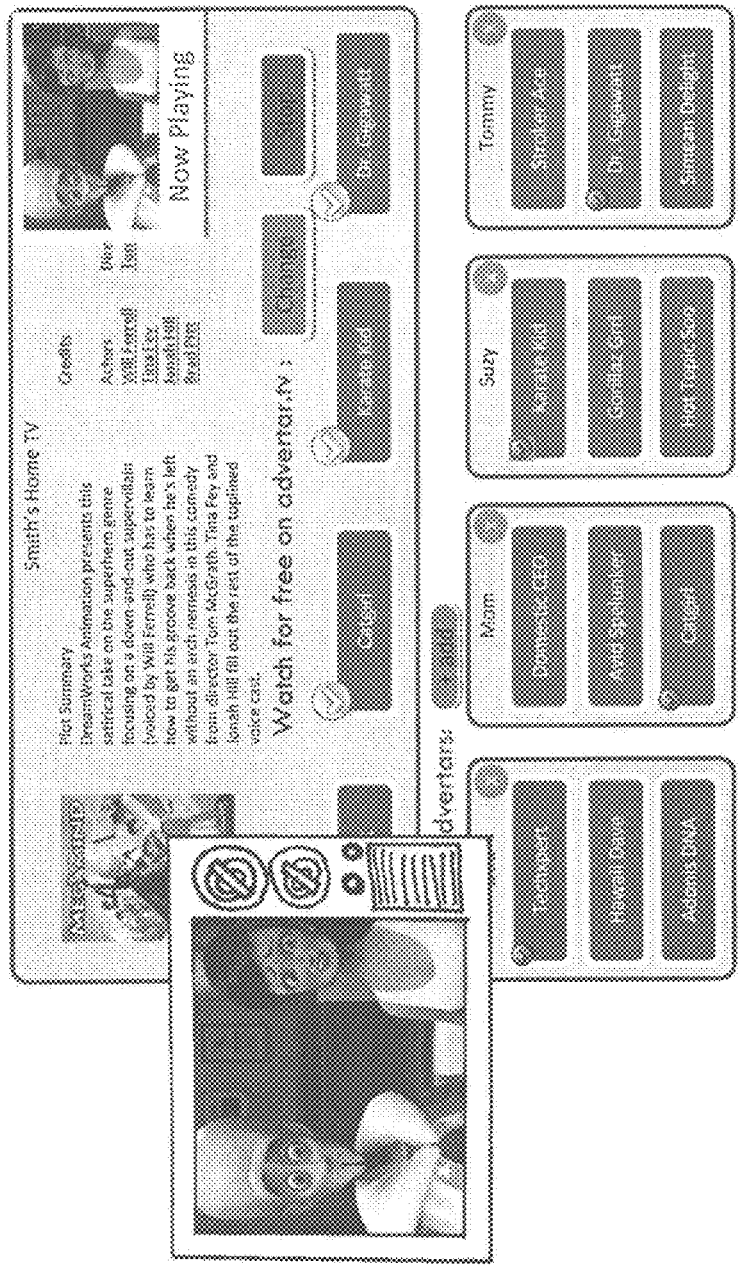
FIG. 20 illustrates one embodiment of representative user interface screens displaying a plurality of user personas logged into a content server and watching a movie.

In one embodiment as illustrated in FIG. 20, multiple personas may be selected which serve to enhance recommendations of advertisements, products, coupons, movies, music, services, books, service plans, interests, TV shows (via an Electronic Programming Guide) etc. Personas may be from different users as well. For instance, as illustrated, while watching an IP TV, mom, dad, Suzy and Tommy may each have particular personas selected. Based on the specific characteristics of the personas, appropriate recommendations can be displayed to them based on commonalities of the personas. For instance, if all the selected personas like pizza, then pizza commercials are shown on the IP TV and/or other devices associated with the personas to provide multi-device interaction. The ad can be shown immediately or at later times on any of the devices. In another embodiment, TV shows that would likely be of interest to each owner of the selected personas can be recommended.

In another embodiment, if a persona has a larger purchasing history in terms of dollars spent, then when that persona enters the proximity of the IP TV and her persona is recognized by the IP TV or other devices the ads appropriate to her persona can be shown to that persona over the preferences of the other selected personas with lesser purchasing histories etc. Recognition of the personas can be via selection on a computing device, proximity of a computing device (with a persona selected) from an IP TV, on a network etc.

In one embodiment, multiple computing devices are connected such as via a peer-to-peer connection. In one example, a tablet computer and the IP TV are connected in this manner with the same persona selected on each device. Each device may display the same or different content. For instance, during an ad which was displayed based upon the characteristics of the persona, the movie on the IP TV may pause for the ad and the website for the ad may be automatically displayed on the tablet. A "pop-up" window may also be displayed on any of the devices to display the movie being paused or other additional information. Variations of the above are also contemplated.

In addition, a displayed ad or other content such as a TV program being watched may be voted on by the user such as "liked" or "disliked" in addition to saving ad for later viewing or sharing the ad to other users/personas via email, SMS, social media etc. The input from the above may be used to refine the persona and enhance future recommendations. If multiple users view the ad, each of their personas could vote as desired.

Figure 25:
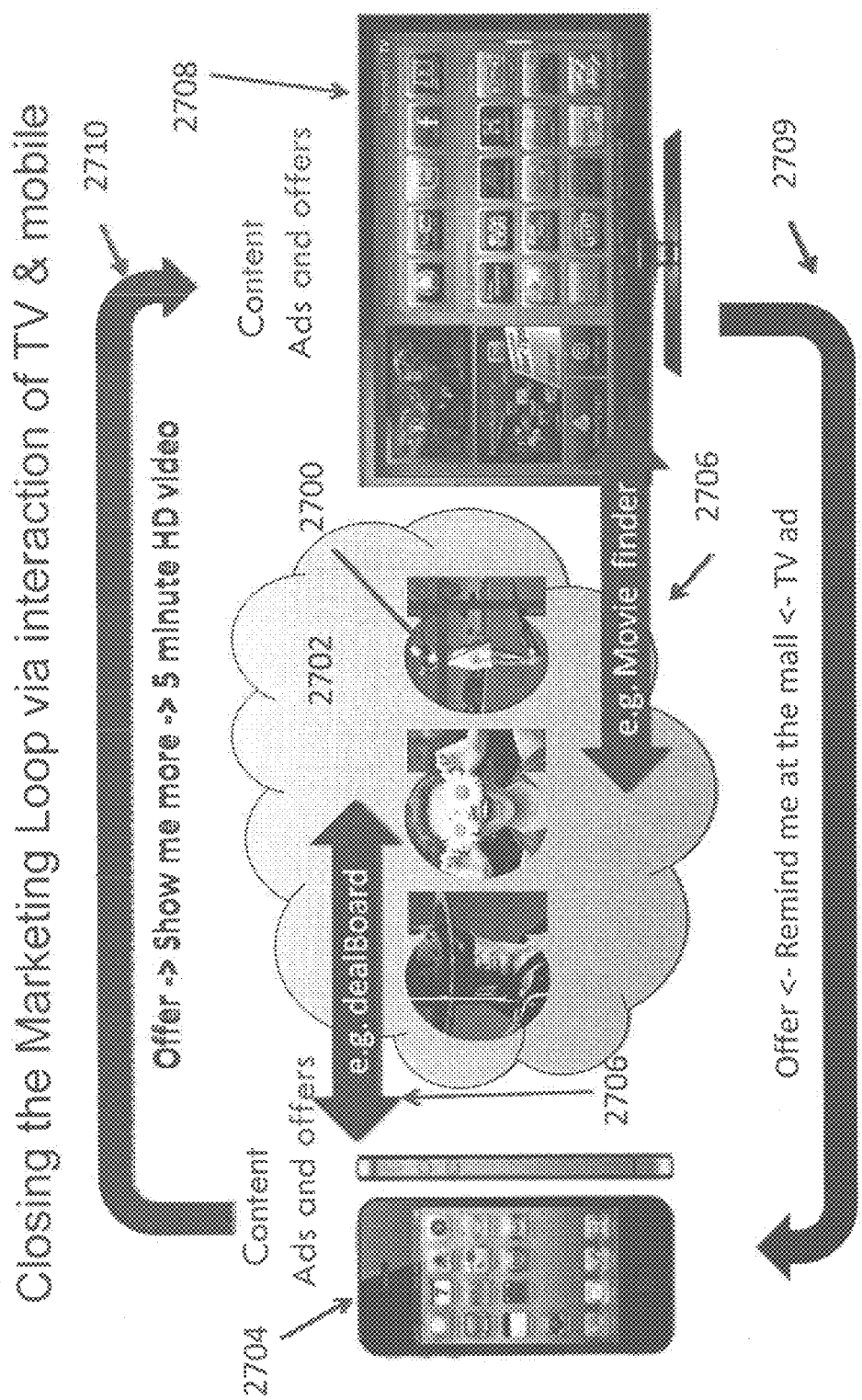
FIG. 25 illustrates one embodiment of a system for delivering advertisements to various user's computing devices in accordance with the disclosed technology.

FIG. 25 further illustrates an implementation of persona use across multiple devices to close the consumer marketing loop via multi-device engagement. Here, a persona may be created on device 2704. The personas 2700 receive ads via an application 2706 received from network 2702. Viewing an ad on device 2704, may cause the display of additional ads on another device 2710 such as IP TV 2708 which includes cable boxes (addressable TV advertising devices). IP TV 2708 can display more detail on an ad and may be communicate with the device 2704 to request further information or request the display of an additional ad at a scheduled time or location at 2709. Here, both devices 2704, 2708 communicate with the personas and can supplement them accordingly with user input from any device in communication with the personas.

Figure 27:
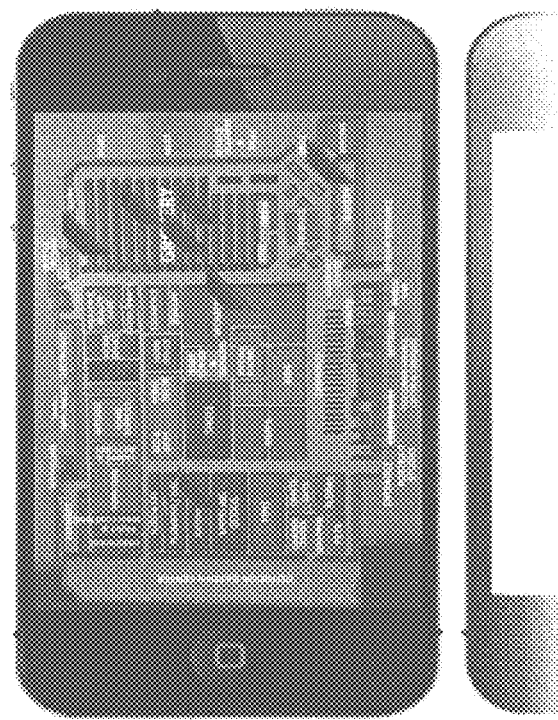
FIG. 27 illustrates one embodiment of a representative user interface screen displaying geographic locations of recommended ads.

In one embodiment, input received from ads selected on the IP TV 2708, causes the mobile device 2704 to remind the user of the ad when she passes a relevant geographical location or upon other appropriate event. FIG. 27 illustrates a map 3002 of a shopping center with locations of stores that are offering relevant ads that are directed to the persona. This provides a consumer navigation functionality and can help efficiently route the consumer and/or alert the consumer to a particular ad when in a certain distance of a store. In this embodiment, WIFI networks can give alerting and directions to the consumer. In one embodiment, routing a consumer to stores may be done via a camera in the device. Specifically, while in a shopping mall, the user may activate the camera, which displays a view through the camera lens in real time. When the user points the camera to a specific direction, an overlay of the location, distance, offer deals (e.g., current inventory) of the store appears when the device is pointed in the direction the store is actually at relative to the user's location. This helps orient and consumer to the correct geographic direction in which to walk to the merchant in the shopping center.

Figure 26:
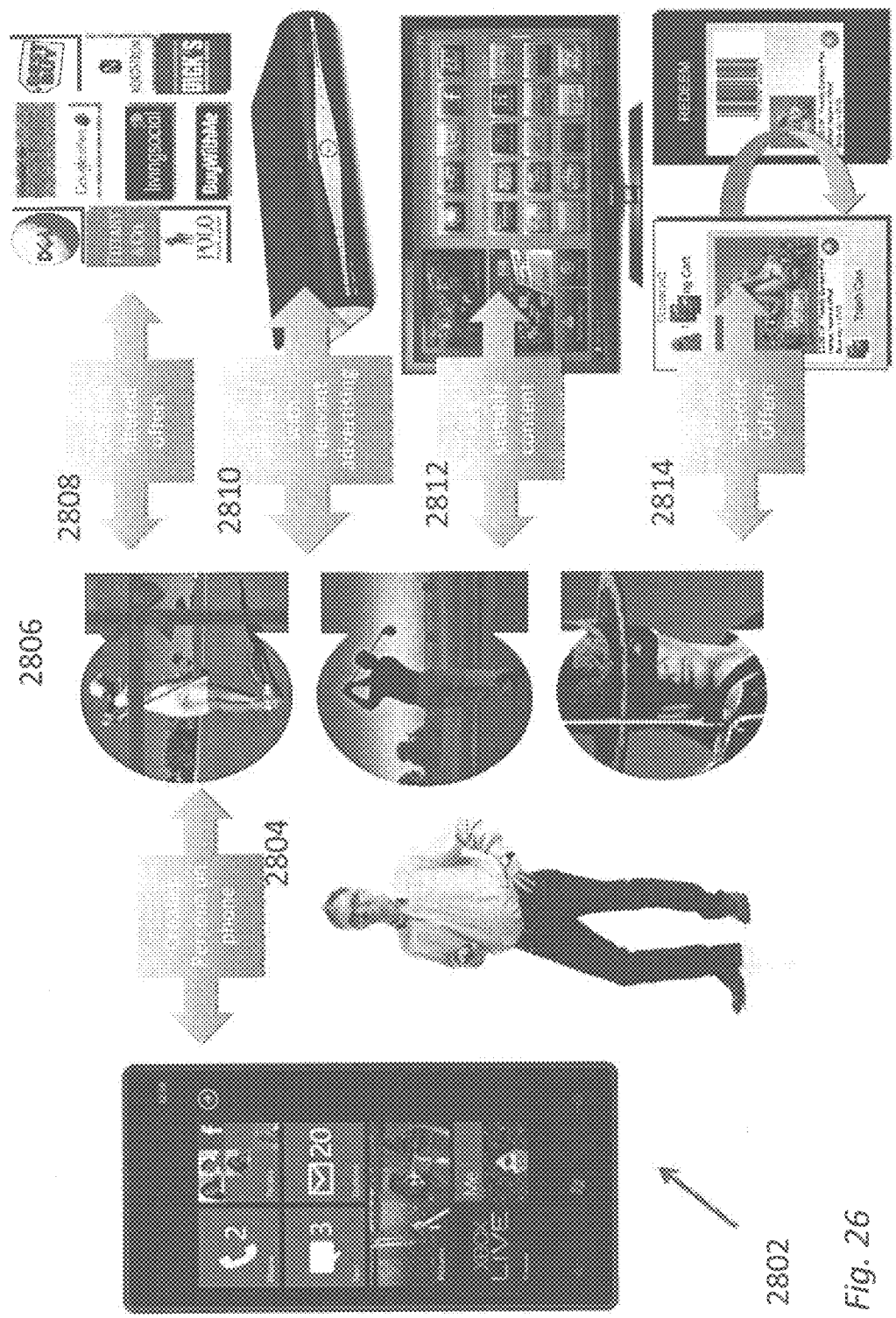
FIG. 26 illustrates various devices that may be used in accordance with the disclosed technology.

FIG. 26 further illustrates another consumer example of multi-device engagement. Here a persona may be created on a mobile device 2802 at 2804 or on any other device. At 2808, one or more personas 2806 may receive filtered/sorted ads on any device connected to, or associated with, the various personas 2806. At 2810, users can interact with the ads. At 2812, consumer can receive recommendations for relevant content such as movies and TV shows and also be served ads. At 2814 the personas may receive offers targeted from specific retailers. Retailers may also offer ads only to personas with certain characteristics such as income, purchase history, device type etc.

Figure 24:
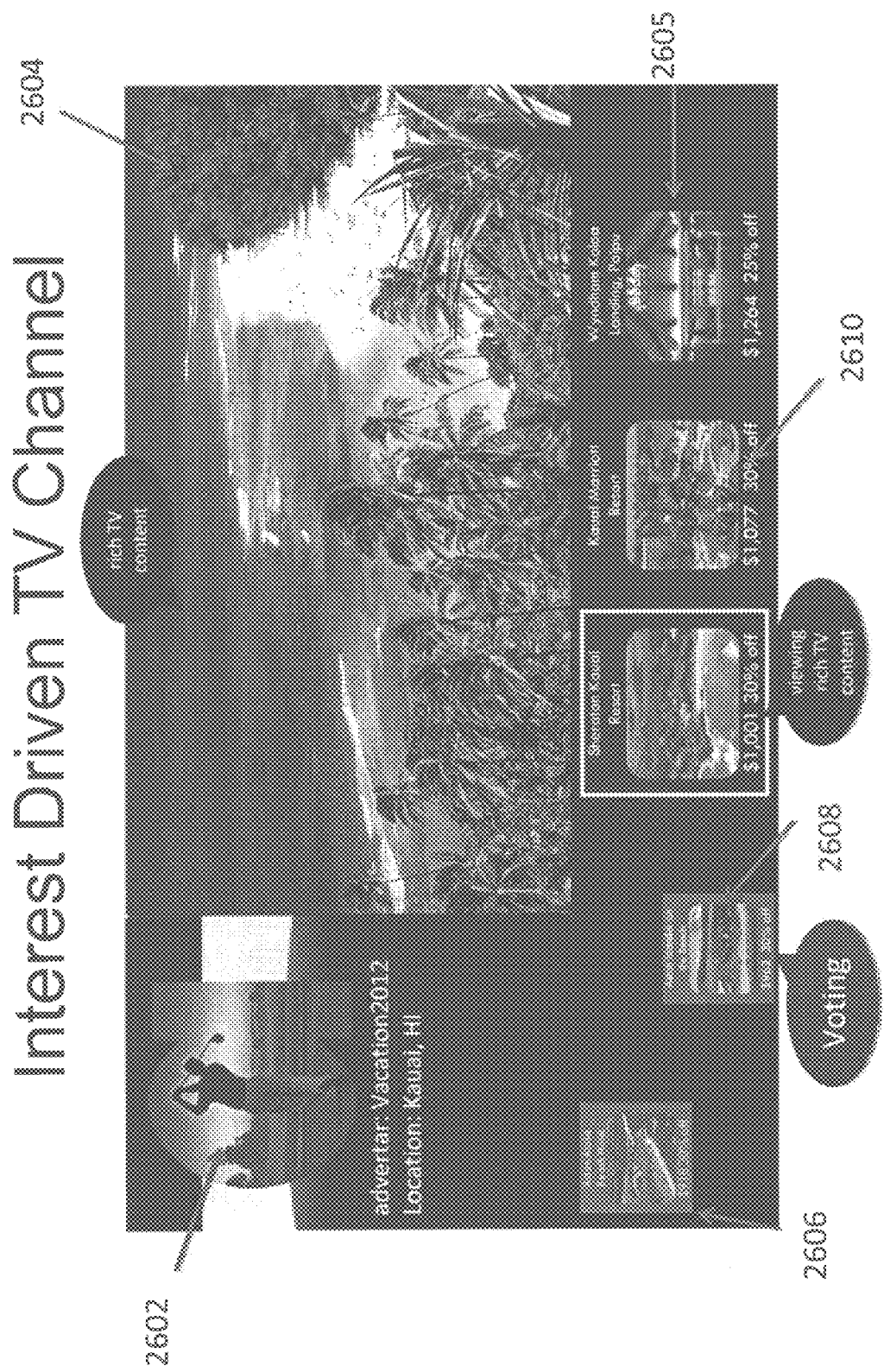
FIG. 24 illustrates one embodiment of a representative user interface screen displaying a persona's interest-based TV channel.

FIG. 24 illustrates a persona IP TV channel to take advantage of targeted advertising, personas and ad voting. At 2602, a persona icon is displayed to show that a persona is active. Content 2604 may be displayed. Ads 2605 can be shown relating to the persona or the content. Ads can be displayed in a neutral row 2610 and at a certain size. Voted ads can be voted up at 2606 or down at 2608. Ads may be sized, colored differently or otherwise marked as voted.

An ad may be selected and the content 2604 may display further information such as a movie about the ad. In addition, multi-device engagement may be implemented at any time as discussed in this document.

2. Brand Sorting Embodiments

In the embodiment shown in FIG. 6, a plurality of brands are first displayed in the neutral area 104 for sorting into the other areas or to be left in area 104. Brands may be presented to a user based upon statistical market research and the desired attributes to be collected. For instance, a "like" of the Huggies Diaper™ brand may suggest a high probability distribution that one is a parent. Selection of Huggies and Toys R' US™ brand may further confirm that one is a parent. Brands may be suggested to a user based upon sites or actions that the user has engaged in, installed apps, keywords or senders/recipients in communications, geographic history (infers you have visited a location related to a brand with a mobile device), contacts/friends, current or future locations, interests etc. Each of the brands may be weighted as desired to help determine desired characteristics.

Upon brand sorting, ads and other recommendations can be displayed to a user. Upon ad feedback, the user may be displayed another series of brands (or ads) to vote on for a finer granularity of recommendations. In one embodiment, this ad voting may adjust values of a single persona vector or even multiple personas. For instance, a demographic dimension within the vector may be voted up or down by a desired amount depending on how an ad is voted. For instance, if many ads that are targeted to a certain demographic are voted up, then that demographic dimension in the persona may be adjusted up. However, to prevent a single dimension within a persona vector from unduly influencing the entire persona vector, dimensions can be optionally bounded.

In another embodiment of the brand sorter, different opinions can be asked depending on the desired context. The chart below illustrates some examples:

|         | Brands     | Advertising    | Offers  |
| ------- | ---------- | -------------- | ------- |
| Up      | Like       | More Like This | Save    |
| Neutral | Don't Care | Don't Know     | Neutral |
| Down    | Dislike    | Less Like This | Discard |

Different combinations and actions can be taken from the above chart. For instance, if a brand is "disliked" the brand's associated values may simply be weighted down in the persona. However, if a brand is not liked, the brand's associated values may be completely discarded. In addition, any associated tags may be flagged as not suitable for the consumer at all. Alternately, this "unsuitable" data may only be discarded for a short time and gradually be reintroduced to the user.

In other embodiments additional information may be displayed to the user during brand sorting during drag and drop selection. For example, as the icon 102b in FIG. 6, is selected by a user with a finger and is gradually moved from its initial position, the initial position may be occupied with "peek text" that serves as information in the space formerly occupied by the icon which may display additional information such as the name of then brand in text etc.

3. Questionnaire Embodiment

FIG. 6 also illustrates a method of efficiently presenting to a user, a single screen for answering multiple questions (e.g., whether the user likes selected brands). Specifically, this method allows a user to answer questions that share the same answer simply by categorizing the questions into categories. The categories serve as the answers to the questions. The categories may be represented by areas on a screen marked with indicia.

Previously large amounts of screen space such as an entire single screen is often used for displaying a single question and potential answers. Such a displayed question maybe regarding brand X and a set of three answers such as "more", "neutral" and "less". When a question about brand Y is needed, another entirely new screen or significant amount of screen real estate is used is used to display a different question about brand Y but with the same answers as brand X. However, FIG. 6 provides a method of collecting information in a much more efficient method in terms of screen real estate space, which provides a more enjoyable and more intuitive user experience.

Specifically, an optional first part of a question may be displayed on a screen as in FIG. 6 "Fashion Brands You Like" and then the second part of the question maybe displayed via icons (e.g., brand X & brand Y). The answers such as user opinions also need only be displayed once as the questions (brands) share the same answers. Answering the questions may be done by dragging the brand icons into the designated answer areas on the screen. In FIG. 6, area 106 "more", 104 "neutral" and 108 "less" are used as answers to which the questions (brands) are categorized (e.g., by assigning metadata to the brands). This method saves significant screen real estate since the first part of the question and the answers (more, less, neutral) are the same for each brand and are thus need only be displayed once. In addition, the brands may be initially displayed in a "neutral" row. The user need only leave the icons in that row if she so chooses that answer, which saves additional time and screen space. To see additional brands, the user need only swipe the neutral row left or right.

In another embodiment similar to that shown in FIG. 6, when additional data needs to be collected, which requires a different set of answers or questions, the optional first part of the question of the first brand sorting may be changed along with the answers and displayed on a subsequent screen. The same or different brands could be shown which a user would be able to categorize in a similar manner to FIG. 6. This subsequent screen of new answers/questions could be displayed by scrolling the first screen with the first set of answers/questions to the subsequent screen. The scrolling could be manual (via gesture, button, voice) or automatic in response to a request for more information to follow-up on the user's answers input on the first screen. A user could optionally scroll between the two screens on a touching to add/modify input.

4. Monetization Embodiments

FIG. 11 also illustrates a system for monetization of the personas. Here audience engine 220 produces an audience of users whose personas fit a desired brand or advertiser definition such as coffee drinkers who live in Seattle and who are over 30 years old, which is gathered or inferred from brand sorting or other techniques.

The advertiser or brand 240 can then use the resulting persona data from the audience engine 220 to analyze their products, ad performance, marketing strategy against any desired audience. Product ad effectiveness to a persona(s) in desired audiences can be ascertained by comparison of common and/or related tags between the persona and the ad tags and associated tag values. Analysis could comprise analyzing user votes on the ads, if the ad was clicked on by the user, if a product was purchased etc. A fee could be charged for such services to the advertiser 240.

Figure 18:
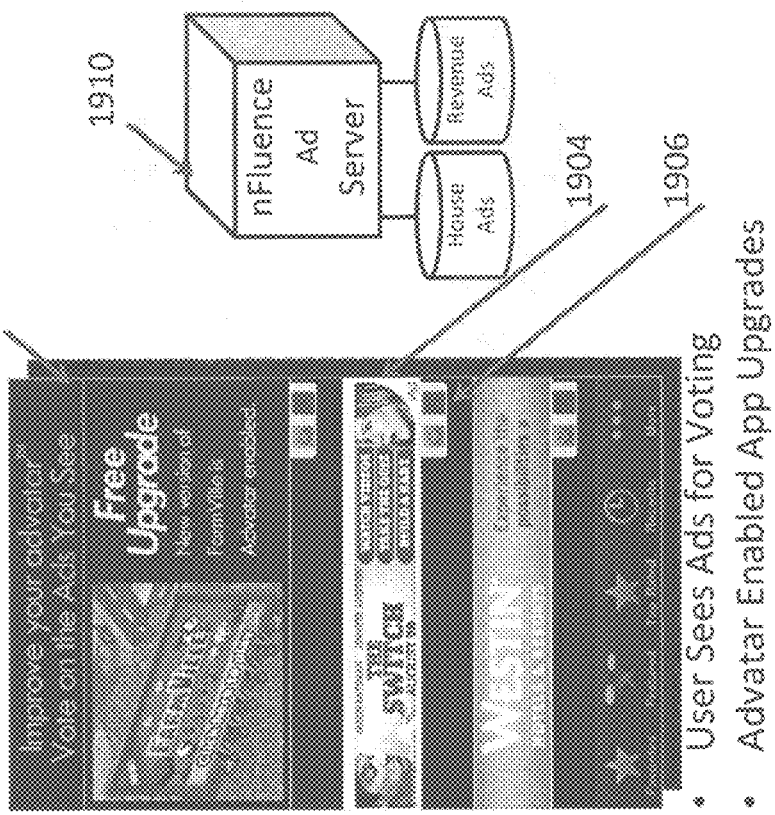
FIG. 18 illustrates one embodiment of a plurality of representative user interface screens which display ads to a user.

Voting on ads can be done within the same mobile device/IP TV/game console that runs the brand sorter application or via other applications or other devices with access to a persona. The first case is shown in FIG. 18 at 1902 in which the persona app is installed and is where the user initially did the brand sorting. Ads 1904 may be shown based on persona demographic data obtained via the brand sorting. The user can vote on ads in a plurality of ways. As illustrated, a "smiley face" and a "frown face" at 1906, is shown for voting. Other methods for voting can be used such as via a slider button, voice input, a "like" button, thumbs up/down, finger gesture(s) on a touch screen etc.

In another embodiment, a third party application (mobile or non-mobile application 1908 or browser webpage on any device) is used to display ads. Typically, a third party application or website designates space (e.g., banner ad space, pop-up window etc.) and pays for a targeted persona ad to be displayed to a user's device via a persona identifier (or optionally without any identifier) which a user may identify herself across applications and webpages. Optionally the destination application/webpage is given computer instructions to enable voting on the ad by the user and to gather and send back feedback. An advertisement for the Persona app is illustrated here.

Computing assets may be arranged to enable the persona app 1902 and the third party app 1908. A server computer 1910 which may be a server attached to, or the same server as, the audience engine in previous figures or a third party server. As illustrated, it is a server attached and run by the same party as the audience engine in FIG. 11. Here, house ads that advertise to the persona app are run as house ads. Ads which may be inserted within the persona application and other applications, webpages etc. are hosted "revenue ads".

FIG. 20 illustrates another embodiment in which personas may be monetized. FIG. 20 illustrates an option to "watch for free" in which users associated with a persona are given free access to selected content. In return for access to the free content, the user is logged into a content server and further marketing research can be performed. Additionally, it may be required for the user to vote on content, ads etc. that are presented during the content.

In one embodiment a persona is being used by a media service such as iTunes™ when a user selects to watch a movie for free, their iTunes account may be initially charged the regular fee to watch a movie. The charge is refunded if the user watches/interacts with the ads associated to the movie. A rewards system may be associated to the persona or the iTunes account and points or money can be credited if the user sends the ads to others, goes to the ad's webpages, interacts with ad related content or if the user buys an advertised product.

In another embodiment, a user can be credited or otherwise incentivized if she consents to her data being sold to advertisers. The credits or better deals can vary according to a sliding scale. Specifically, more credit is given if more of the persona or even personally identifiable information is consented to be given to advertisers.

5. Email Accounts and Personas Embodiments

In one embodiment, under a single user account, each persona may be associated with a separate email address. This permits the user to have an email address focused specifically on a single persona. Each persona my have the ability to decline/filter communications according to keyword, sender, dates or other criteria to prevent the persona from being overwhelmed with unsolicited communications.

Figure 28:
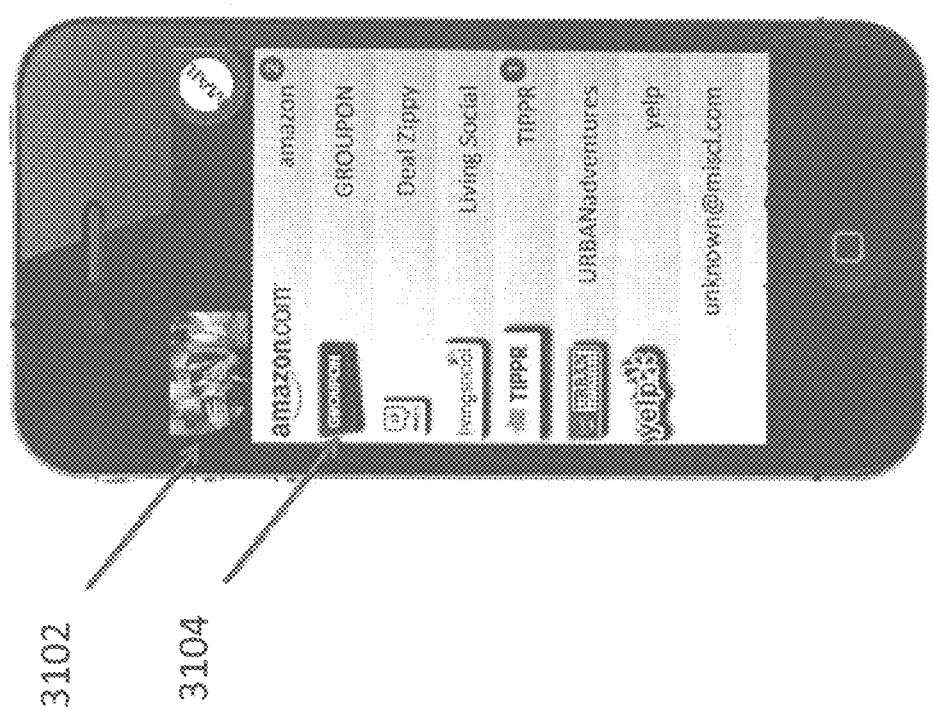
FIG. 28 illustrates one embodiment of a representative user interface screen displaying a persona's email program.
Figure 29:
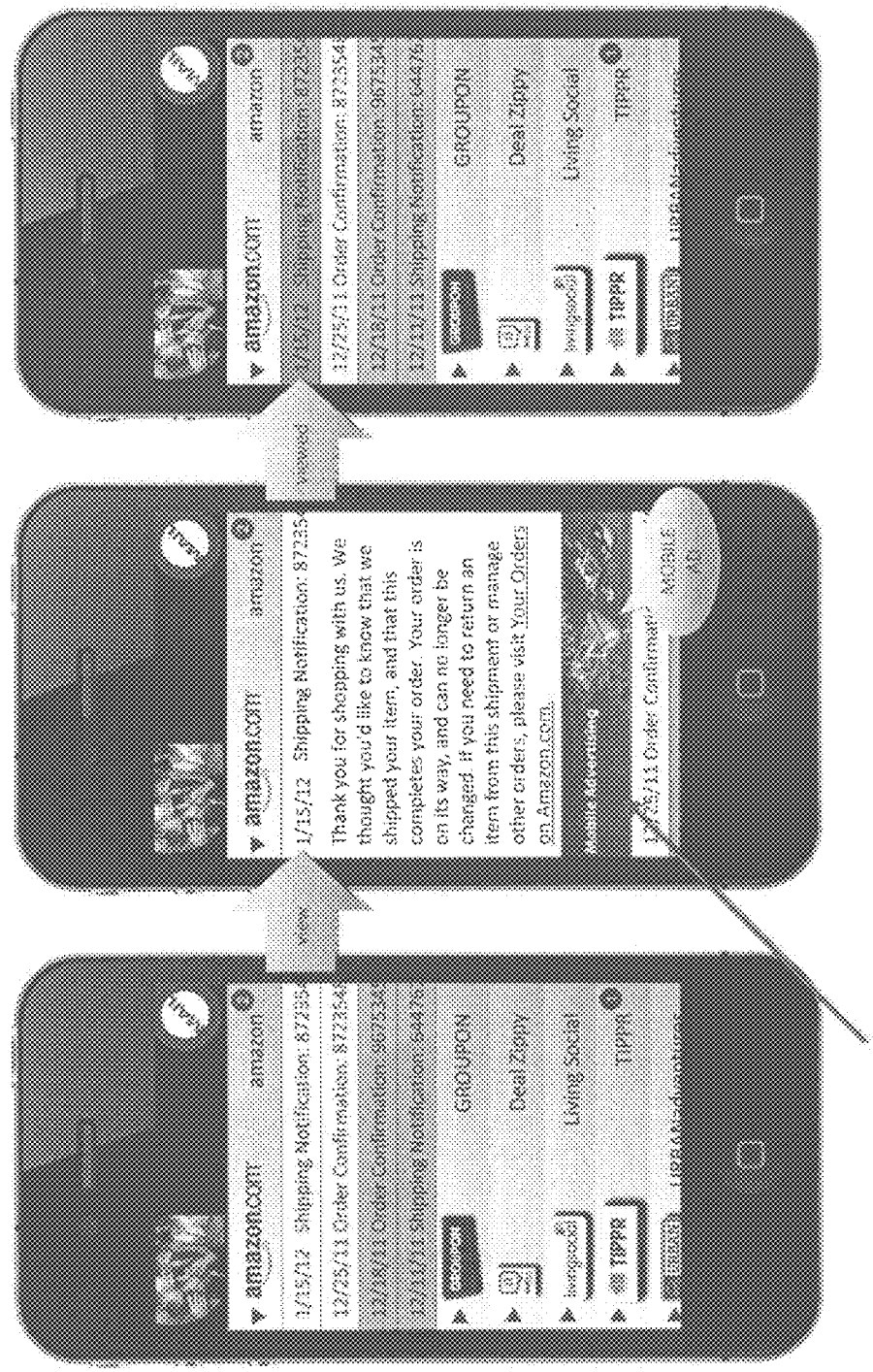
FIG. 29 further illustrates one embodiment of a representative user interface screen displaying a persona's email program.

As illustrated in FIGS. 28-29, a persona may be associated with an email program and an address to help organize information. New email addresses may be created by appending information to existing email addresses. For instance, if an email is brian@roundtree.org, a new email address for a persona may be brian@roundtree.org.0mail.com or other methods can be used to create new email addresses.

The persona 3102 may access an email program as shown in FIG. 28. The email program may group persona emails by domain 3104 and may associate an icon and company name upon domain recognition. An active persona icon 3102 may also be displayed.

An arbitrary level of importance assignment may be featured in which high importance messages such as password assignments are given certain levels that are marked next to the domain "level 1" indication and lesser important emails are given lesser importance levels.

FIG. 29 illustrates functionality of the email program for a specific persona. Here, emails are listed by domain, assigned importance levels and may be read. At 3202, advertising can be directed in the email program using technology discussed in this document. Optionally, the advertising may be based on the active persona and/or related to the subject of the message being read. In addition, once the email is read, it is marked as viewed.

6. Persona Sharing Embodiments

Figure 19:
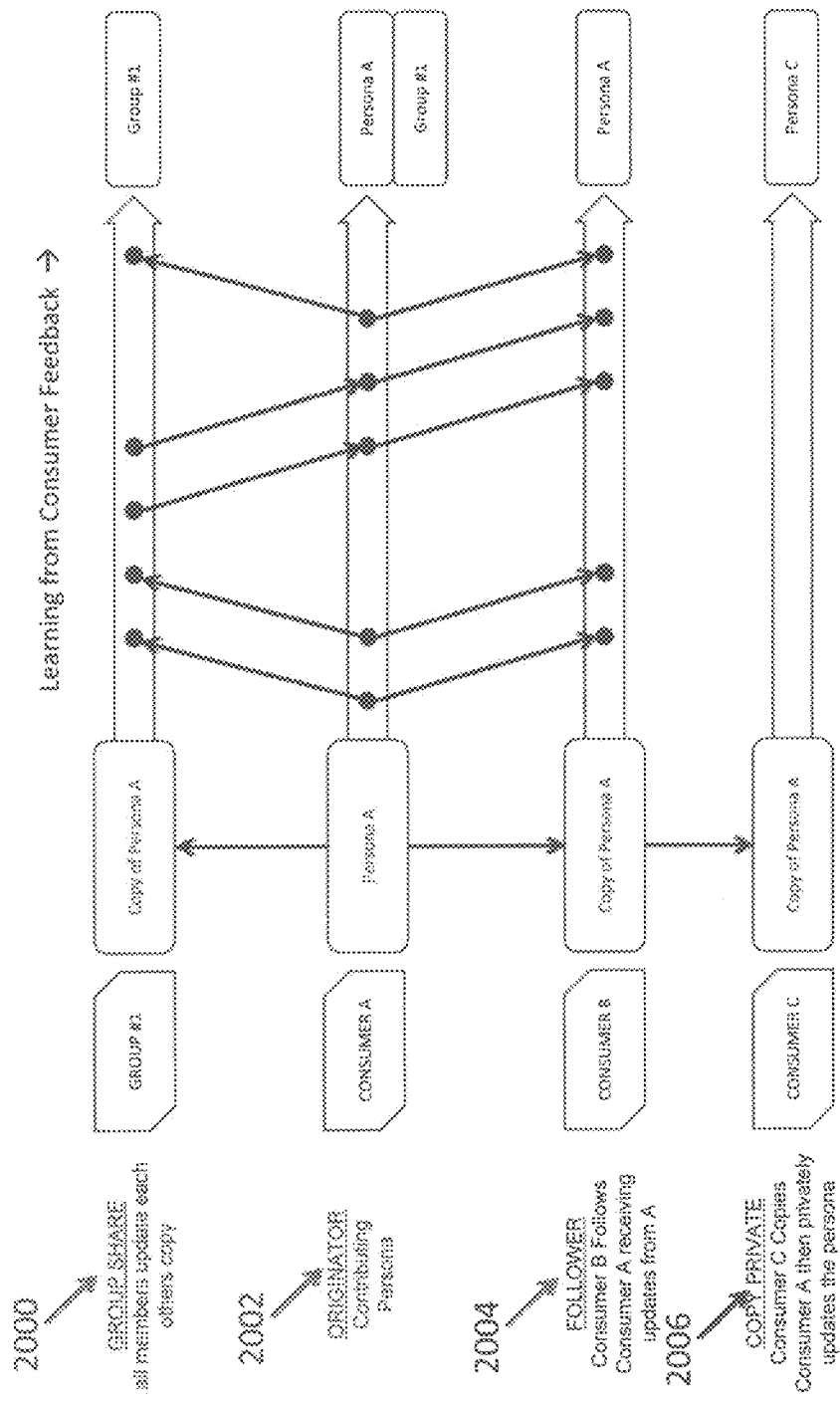
FIG. 19 illustrates one representative method of how persona information can be shared with other personas.

FIG. 19, illustrates several embodiments for persona sharing. Sharing personas permits users to gain expertise from other users' personas as consumer feedback is gained.

An originator 2002 of a persona A can share the persona with members of Group #1 at 2000 which creates a copy of persona A. Changes made to persona A are sent to members of Group #1 and the changes are shared with the originator 2002.

At 2004, another embodiment called a follower is shown. Products and services can be recommended to a persona that is created by the originator 2002 and adopted by the follower. As such, the characteristics of a merchant created persona could be factored into the characteristics of the user created persona. A merchant may offer a plurality of personas for consumers to access. These merchant personas may be created by relative experts in areas the merchant is involved in such as product experts. This produces a loyalty to the merchant. A "wiki" like rating system could be implemented for the originator persona and/or the authors of the personas to indicate to potential users the perceived quality of the persona. Followers may also be given discounts for following personas of merchants as an incentive.

Persona characteristics such as popularity or quality rank relative to other personas, items bought, time spent in personas, rank in social media competitions could be tracked and shown to other users and persona creators.

Finally, copy private at 2006 shows a consumer who makes a copy of persona A and privately makes one or more updates to the persona without sharing.

Additional embodiments may include a method of allowing sharing of a persona for a specified time. In other embodiment, a user can share a persona with another user before or after a desired amount of time, the second user can gradually share less and less of the first persona, which permits over influencing the second persona. Different aspects of the information taken from the persona may be weighted as desired to prevent an undue influence on the persona as a whole.

7. Carrier Guru Persona Embodiment

Figure 21:
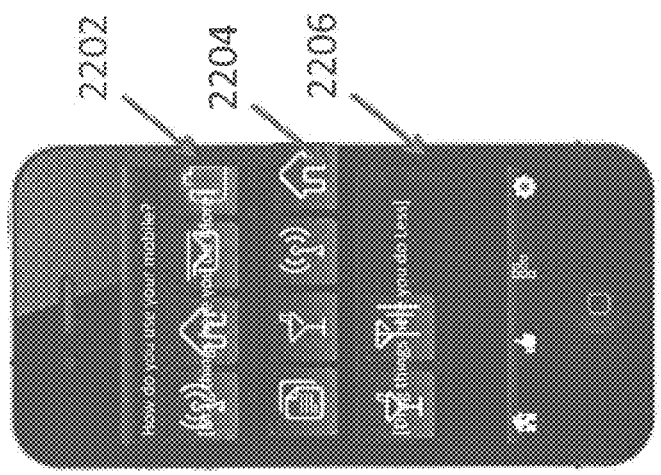
FIG. 21 illustrates one embodiment of a representative user interface screen for configuring a persona used to allow a software guru persona to make recommendations to a user.
Figure 22:
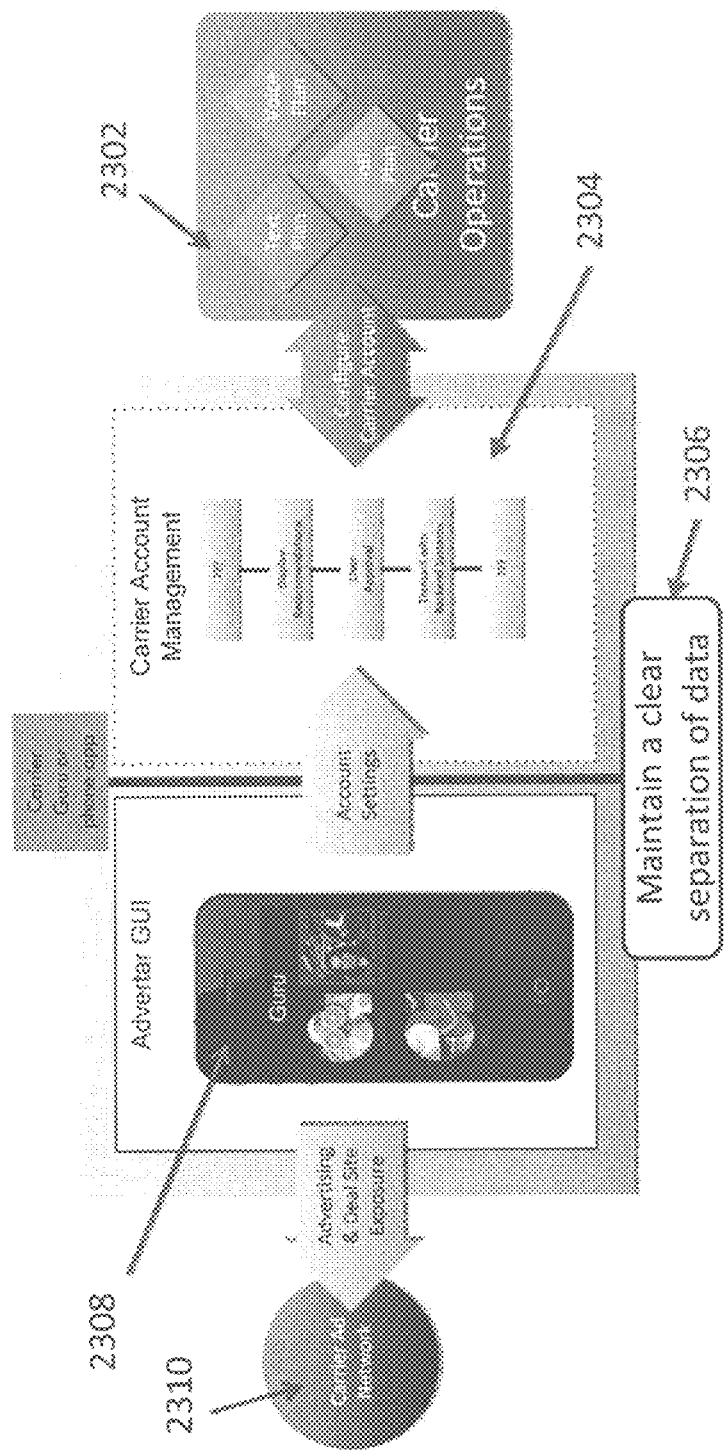
FIG. 22 illustrates one embodiment of a system for delivering advertisements to a user's computing device in accordance with an embodiment of the disclosed technology.

In one embodiment illustrated in FIGS. 21-22, enhanced consumer privacy may also be emphasized. For instance, telecom carriers, among other types of entities such as health care organizations, are frequently concerned about having an excessive amount of information about a consumer and/or sharing said information with others considering the strict government regulations and the fact that they store so much personally identifiable information about a consumer such as their credit card number etc. As such, information contained in a persona may debatably increase legal liability to the carrier.

In the embodiment shown in FIG. 22, a phone/minute plan could be recommended by a carrier persona in combination with the user persona. Here a carrier mobile application or website may allow the user to select a carrier persona via advertar screen 2308 that could be combined with a user persona. The combined new persona (or a stand alone persona) would serve as a template to select/manage the user's phone/minute plan or other services at 2302-2304. Alternately, a user persona may be used without combination with a carrier persona to obtain demographic characteristics of the user. From this, a carrier can make appropriate recommendations.

As illustrated in FIG. 21, an exemplary user interface screen displays a brand sorting screen similar to that shown in FIG. 6. Specifically, instead of brand logos being presented for user sorting, tiles representing activities or locations or other information the carrier might request the user might engage in are initially presented in neutral row 2204. Such tiles like wireless access, document reading, mail may be displayed etc. A question is displayed to help give the user context such as "how do you use your mobile". Three rows 2202-2206 are presented and may be given the indicia "neutral", "drag things here you do more" and "drag things you do less here".

Selection of these activities may influence the composition of the persona and aids in selection of products. However, the carrier may optionally be insulated from actually having access to the information in the user's persona.

In another embodiment, carrier personas may be shared with advertisers as illustrated in FIG. 22 at 2310, by creating a barrier 2306 which does not share the user's personally identifiable information. Carriers could then participate in monetization of advertising without compromising user privacy.

In another embodiment, the carrier is able to recommend products without it or the advertisers having direct access to the information in user's original or optionally the combined persona. In this embodiment, the carrier could prevent itself from having direct access to persona data via an intermediary. Specifically, a third party could act as an intermediary and host the user's persona and the user's new combined persona. The carrier need only deploy/distribute the discussed technology on the device and it would be insulated from having access to the personas while it may receive a revenue share in return for deployment/distribution of the technology on the device. From the new persona, product recommendations such as minute/plans or even products from any desired merchant may be recommended to the user.

8. Universal Persona Embodiment

In one embodiment, once a persona is created, the persona may be used on multiple platforms, devices, applications, as well as in multiple services such as different search engines, social media services, merchant services such as iTunes/Amazon services etc. For instance, a persona created on an iPhone application maybe accessed by another application on the same device or by the same or different application on another iOS™ device. In addition, the persona may be accessed by applications across operating systems, on non-mobile computing device such as a desktop, server or IP TV, search engines etc.

In addition, the persona may be formatted or otherwise adjusted to be used to replace cookies in browsers. For instance, the Google™ search engine typically inserts a cookie on a computing device to track user activities and aide in user searches. Persona data may be formatted to replace this cookie. Instead of tracking information on a user basis, the cookies can be set to record information on a persona basis. The replacement maybe transparent to the browser and to the search engine. The result is a user created functional equivalent to a cookie but specific to a persona. Upon replacement, a user may decide to stop/limit Google's tracking and rely on the persona cookie to funnel relevant advertising and searches to her etc. This produces a privacy friendly way for a user to curate what is in her cookie and stop behavioral tracking.

In one embodiment, a tool bar interface for a persona can be created. This can be used to display which user persona is active within a web browser. Upon activation of one persona, a persona cookie (a separate cookie may exist per persona) may then interface with a search engine or other service and upon a user typing a query into the search engine, the persona may influence which results are shown and/or the order of the search results, ads or other data shown or output to third parties according to the characteristics of the persona.

In one embodiment, advertisers may use SEM and SEO to influence the search results that a persona receives. Specifically the SEM and SEO acquired by the advertiser may be related to a persona's characteristics. In one embodiment, a user searches for "biking" on a search engine. The term "biking" was purchased by an advertiser and a resulting search result is a link to the advertiser created "biking" persona. When the user utilizes the advertiser's persona, the search results/ads returned while that persona is active could be influenced by the advertiser.

In one embodiment, the persona may be stored locally or it may be stored remotely. Typically an ID is assigned so a user can access the profile from multiple computing devices.

In another embodiment, a persona is configured to be used with and shared via social media (e.g., Facebook™). A persona may have its own social media account and integrate information, friends and other information on the social media account to aid in persona refinement. A description of the persona may be attached and the persona may be configured to be shared, copied or otherwise interacted with. In this embodiment, recommendations such as other users to connect to (e.g., invite as friends) can be made based on your persona and their persona. This matching may be done by similar demographic characteristics in a manner similar to how personas and ads are computed above. Recommendations can be made ranging from an appropriate time to communicate with someone based on similar personas and triggering events such as entering a common geographic area to recommending other users to coordinate group purchases based on common demographic characteristics. In another embodiment, a persona could be applied to on-line dating. Specifically, based upon the persona and optionally other factors, a suggestion may be made on a suitable match.

9. Calendar Embodiment

In one embodiment, a keyword/phrase may appear on a user calendar. A user may share their Outlook™ calendar or other calendar with their persona and the merchant's ads may be displayed to the user in proximity to the date that a user indicated she needs to replace her tires. This keyword/phrase such as "replace tires" may be optionally bid on by a merchant. Winning the bid gives the merchant the right to display their ads to the persona and get data back on ad conversion rates, consumer behavior (assuming consumer permission) as well as other information. The merchant could prepare additional inventory if a certain threshold of users indicated their tires need replacing.

10. Photo Sorter Embodiment

Figure 17:
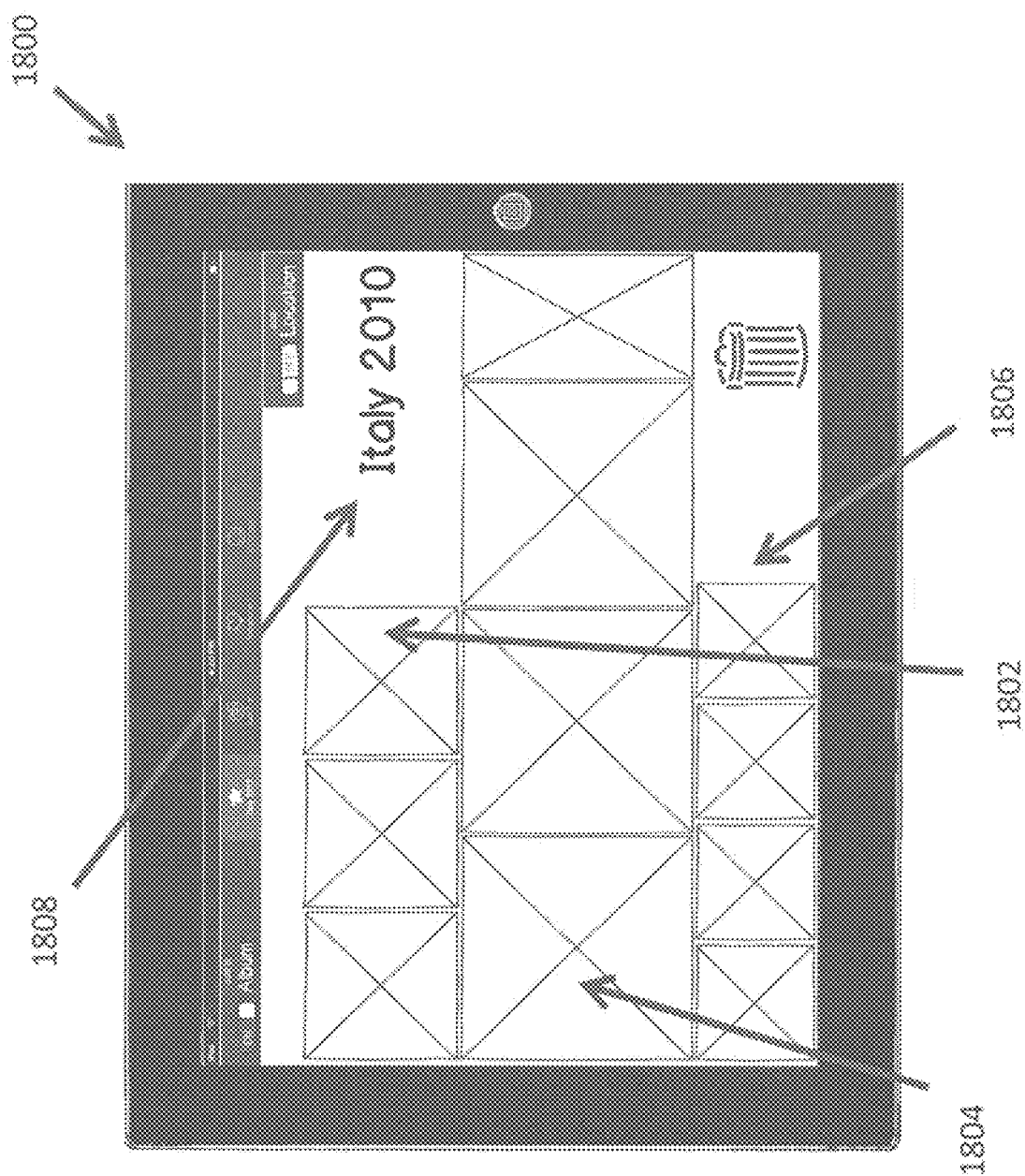
FIG. 17 illustrates one embodiment of a photo sorter in accordance with an embodiment of the disclosed technology.

In FIG. 17, another embodiment is illustrated. Here, a method 1800 is shown which allows pictures to on a tablet or other device to be sorted in a manner similar to how brands are sorted as illustrated in FIG. 6. The pictures in this embodiment are to be categorized into three different rows (here differently sized). As a user moves the pictures into a different row, metadata may be tagged to the picture which aids in sorting the pictures by changing its properties. For instance row 2 1804 shows pictures to be sorted. Pictures may optionally be initially placed here. If a user moves the picture or otherwise assigns the picture to row 1 1802, the picture is assigned the same metadata such as "Italy 2010" 1808. If the picture is moved to row 3 1806, then the picture will be sent to the trash. Various other embodiments are contemplated such as different groupings (e.g., columns, piles etc.) and variations on picture size, orientation etc.

This embodiment among others also illustrates a resizing of the image according to categorization. For instance, pictures in row 3 are smaller than pictures in the other rows. This saves on screen real estate as pictures in row 3 are less important (they will be deleted) and therefore resolution is less important. Resizing may be done dynamically in a variety of methods. One such method is dynamic resizing which gradually scales the icon down or up in size as a function of the distance toward a desired area on the screen. For instance if a picture from row 2 1804 is moved toward row 3 1804, whose pictures are smaller, the image gradually and smoothly scales down in size. In one embodiment, a fluid/smooth effect is displayed to the user as the picture smoothly gets smaller until it reaches row 2 1806 in which the picture is the same size as pictures in row 2 1806.

Figure 23:
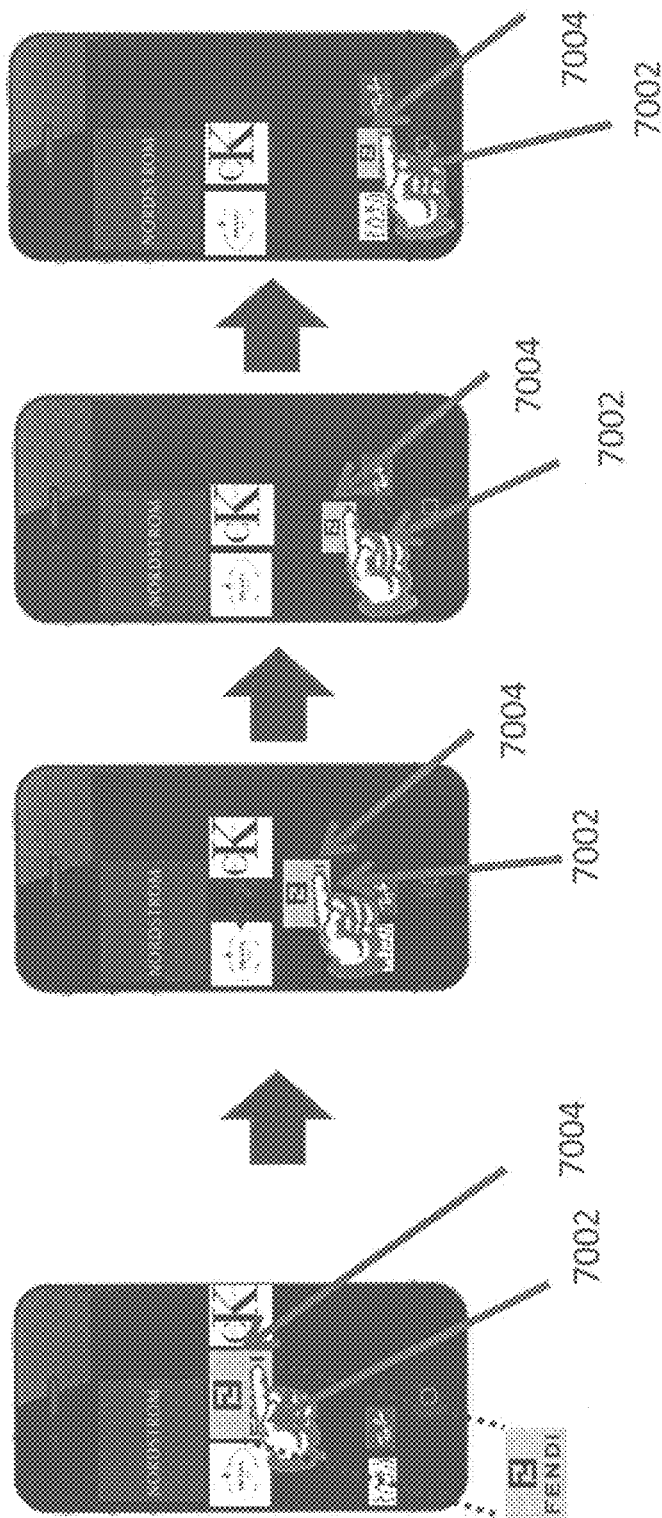
FIG. 23 illustrates rescaling brands on a representative user interface screen.
Figure 31:
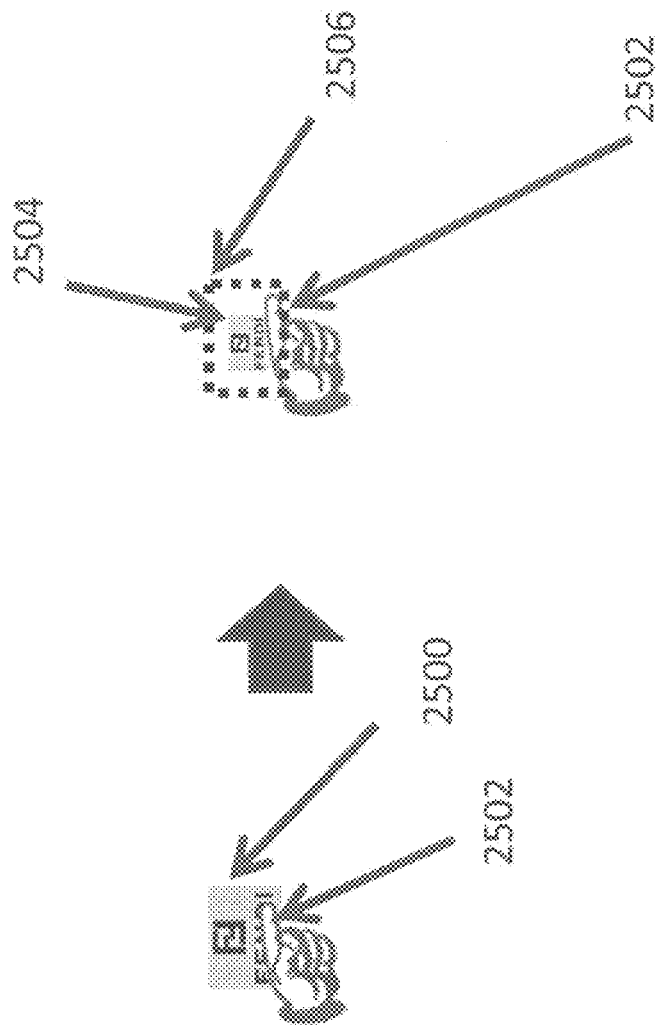
FIG. 31 illustrates a prior art method of resizing and moving an icon without a user having a continuous position on an icon.

In one embodiment, are computer executable instructions for maintaining a continuity of a picture selection point by keeping a finger or other pointing device continuously in the same place on an image continually during resizing. For instance, as seen in FIG. 23, if a finger 7002 is placed on a the lower right hand side corner of a picture 7004 and the user moves it to an area of the screen which resizes the picture smaller while moving it to the bottom row (whose icons are smaller than the middle row), the finger 7002 would remain in the lower right hand of the picture 7004 regardless of the size of the picture. Previously as seen in the prior art in FIG. 31, if a user resized a picture 2500 using prior art methods, starting with her finger 2502 in the lower right hand corner, her finger 2502 typically would not be on the lower right hand of the picture as the picture would have resized 2504 (outline of original 2500 at 2506) to the point where the image would scale to such a degree that her finger would not be on the picture or on the same place on the picture (if the picture got scaled larger). This continuity of selection point provides less disorientation to a user and a more natural experience both when the picture is sized down and up.

Figure 30:
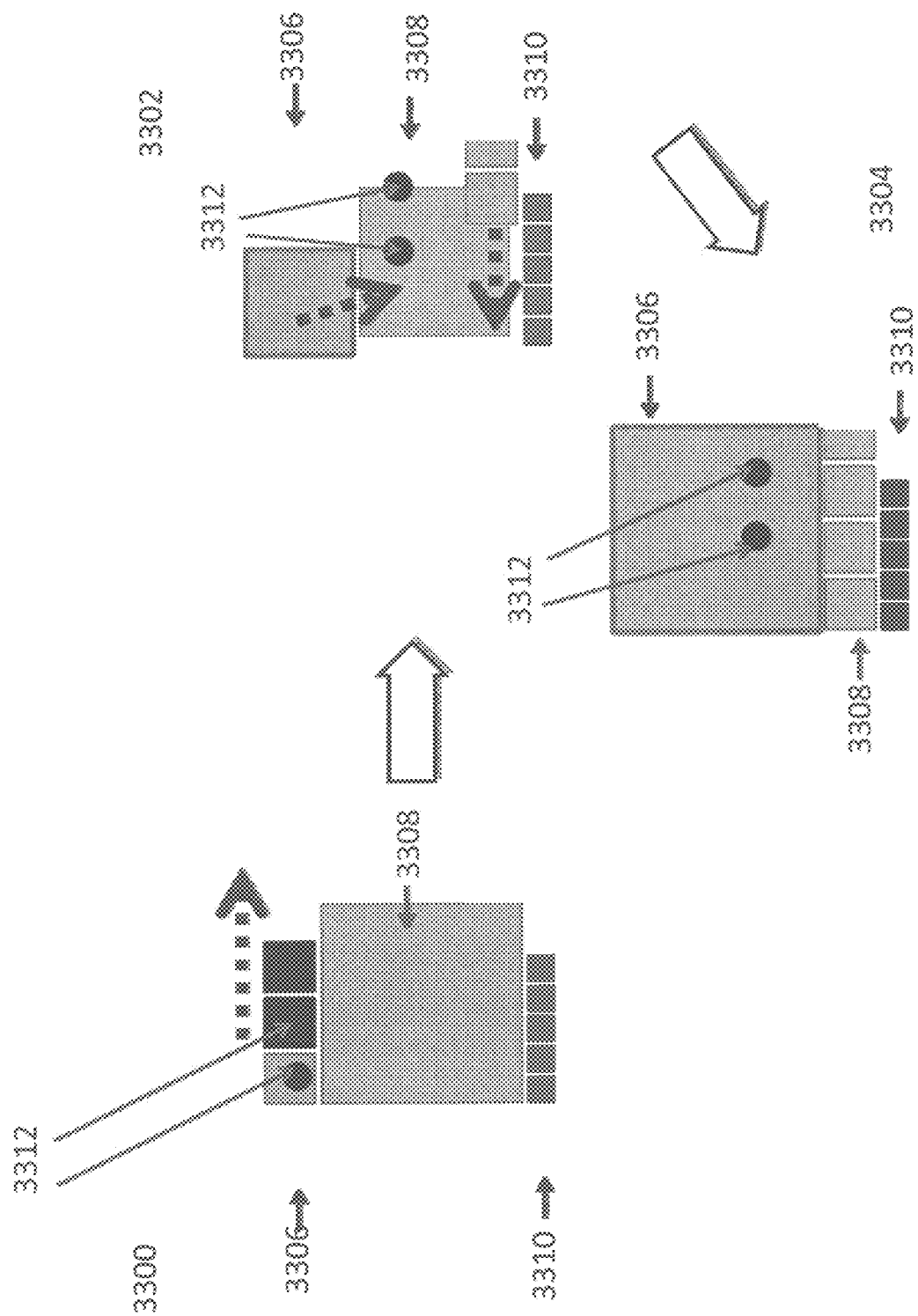
FIG. 30 illustrates one embodiment of a resizing of various groups of brands relative to other groups of brands.

FIG. 30 illustrates an embodiment that can be used with the photo sorter or other technology discussed herein such as the exemplary interface screen in FIG. 6. FIG. 33 focuses on resizing groups of differently sized brands, with gestures on a touch screen another other input methods may be used.

At 3300, three rows of brands are displayed 3306-33010, all with different sizes. In order for a user to see brands in the rows that are sized smaller, a user could use a gesture such as a two finger gesture at 3312. The black dot which represent finger input, on the left most brand and a black dot on the square to its right (not shown) may be used to instruct the device to resize the row 3306 as the fingers are dragged down on the touch screen.

At 3302, a brand of row 3306 is enlarged and brands in the same row are optionally excluded from display. Row 3308 may be downsized and more ads may be inserted in this row.

At 3304, a brand of row 3306 is significantly larger and the brands in row 3308 are now significantly smaller. Any combination of sizing of the various rows can occur upon a gesture input. Rows, columns and other grouping may also be used.

As discussed in this document, the discussed subject matter solves several technical problems. Specifically solved is the input and processing of user input information such as brands to efficiently determine user characteristics on a small mobile device screen. In addition, the unique layout of how the questions and answers are presented requires less input by the user, requires less screen space and provides a more enjoyable user experience which results in a significantly higher participation rate. The related processing by a client/server is also made more efficient due to the enhanced gathering of information. Also solved is the problem of the user being overwhelmed with irrelevant advertising. The advertar solution as discussed herein, creates efficiencies as the user can more easily filter information and therefore be fed relevant ads.

11. Description of Computer Hardware

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A non-transitory, computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing device using data stored on one or more computer-readable storage devices or received from other sources. A representative data processing device is shown in FIG. 15.

The data processing device includes "processor electronics" that encompasses all kinds of apparatus, devices, and machines for processing data, including by way of example a programmable microprocessor 602, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices 604 for storing data, e.g., flash memory, magnetic disks, magneto-optical disks, or optical disks. However, a computer need not have such devices. Moreover, a computing device can be embedded in another device, e.g., a mobile telephone ("smart phone"), a personal digital assistant (PDA), a mobile audio or video player, a handheld or fixed game console (e.g. Xbox 360), a Global Positioning System (GPS) receiver, or a portable storage device (e.g., a universal serial bus (USB) flash drive), to name just a few. Devices suitable for storing computer program instructions and data include all forms of volatile or non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device 608, e.g., an LCD (liquid crystal display), LED (light emitting diode), or OLED (organic light emitting diode) monitor, for displaying information to the user and an input device 606 such as a keyboard and a pointing device, e.g., a mouse or a trackball, track pad etc., by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. The data processing apparatus 600 may also include a wireless transceiver 612 such a cellular radio, WiFi or WiMax transceiver, Bluetooth transceiver and a network connection 614 etc. The data processing device may also include an output device such as a printer 610. In addition, the device may include location sensing devices (GPS etc.), as well as clocks and other circuitry (not shown).

As shown in FIG. 16, embodiments of the subject matter described in this specification can be implemented in a computing system 700 that includes a back-end component, e.g., as a data server 750, or that includes a middleware component, e.g., an application server, or that includes a front-end component, e.g., a client computer 600 having a graphical user interface or a Web browser 650 through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a wired or wireless local area network ("LAN") and a wide area network ("WAN"), an inter-network 710 (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server 750 transmits data (e.g., an HTML page) to a client device 600 (e.g., for purposes of displaying data to and receiving user input from a user interacting with the client device). Data generated at the client device (e.g., a result of the user interaction) can be received from the client device at the server. In the embodiment shown in FIG. 16, the server computer 750 operates server engine software 760 and web management software 760 to receive data from and send data to remote clients. In addition, the server computer operates a database 800 to store persona information for users who wish to receive ads as described above. Content management software 780 and database management software 790 allow the server computer to store and retrieve persona information from the database and to search the database for personas that meet advertiser's criteria for a target audience.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A processor-based system for receiving advertisements, comprising:
   memory for storing instructions that are executable by processor electronics;
   a sensor for determining a location of the system;
   a display screen;
   processor electronics configured to execute the instructions in order to:
   display a plurality of icons to which advertisements can be directed to a user;
   receive a selection from the user to activate a first icon of the plurality of icons to which advertisements can be directed during a time period when the icon is active, wherein the first icon defines one or more characteristics of the user that can be analyzed by an advertiser to determine a target audience for an ad;
   in response to the selection of the first icon, select a cookie associated to the first icon, wherein the cookie is configured to reference a portion of user interest data collected during the period of time when the first icon is active;
   display an ad directed to the selected first icon;
   determine the location of the system;
   in response to the location determination automatically select a second icon from the plurality of icons that defines one or more characteristics of the user to which ads are to be directed based on the determined location; and
   in response to the selection of the second icon, select a second cookie associated to the second icon, wherein the second cookie is configured to reference a portion of user interest data collected during a second time period that the second icon is active.

2. The processor-based system of claim 1, wherein the instructions cause the processor electronics to:
   display ads based on the determined geographic location of the user.

3. The processor-based system of claim 1, wherein the instructions cause the processor electronics to:
   display ads that are valid within a desired distance of the user.

4. The processor-based system of claim 1, further comprising a clock for determining a time, wherein the instructions cause the processor electronics to:
   determine the time from the clock; and
   display ads based on the determined time.

5. The processor-based system of claim 1, further comprising a clock for determining a time, wherein the instructions cause the processor electronics to:
   determine the time from the clock; and
   change the icon that defines one or more characteristics of the user to which ads are to be directed based on the determined time.

6. The processor-based system of claim 1, wherein the instructions are executable by the processor electronics to:
   download one or more characteristics of a persona from a remote computing device;

combine the one or more characteristics of the persona with the one or more characteristics associated to the first icon; and receive ads selected by the advertiser based on the combined data comprising the one or more characteristics of the persona and the one or more characteristics of the user associated to the first icon.

7. The processor-based system of claim 1, wherein the instructions further cause the processor electronics to download a persona from a remote computing device;

modify the persona by deleting at least one characteristic associated to the downloaded persona in response to a user request; and receive ads selected by the advertiser based on the modified persona.

8. The processor-based system of claim 1, wherein the instructions further cause the processor electronics to:

display a representation of a persona created by another user and stored on a remote computing device;

in response to user selection of the representation, transmit an indication to the remote computing device indicating selection of the persona; and receive ads selected for the persona.

9. The processor-based system of claim 1, wherein the plurality of icons displayed to the user on the screen comprises at least four icons.

10. A processor-based system for receiving advertisements, comprising:

memory for storing instructions that are executable by processor electronics;

a sensor for determining a location of the system;

processor electronics configured to execute the instructions in order to:

receive a selection from a user to activate an icon to which advertisements can be directed during a time period when the icon is active, wherein the icon defines one or more characteristics of the user that can be analyzed by an advertiser to determine a target audience for an ad;

in response to the selection of the icon, select a cookie associated to the icon, wherein the cookie is configured to reference a portion of user interest data collected during the period of time when the icon is active;

display an ad directed to the selected icon;

determine the location of the system;

automatically select a second icon that defines one or more characteristics of the user to which ads are to be directed based on the determined location;

in response to the selection of the second icon, select a second cookie associated to the second icon, wherein the second cookie is configured to reference a portion of user interest data collected during a second time period that the second icon is active;

transmit a request from the user to a remote computer to request access to a first and second portion of data associated to a third icon, wherein the first and the second portions of data associated to the third icon define one or more characteristics defined by another user that can be selected by an advertiser to determine a target audience for an ad, wherein the first portion of data is not accessible to the user after a defined time period; and display an ad to the user which was selected based upon at least a portion of either the first portion of data or based upon a portion of the second portion of data.

11. The processor-based system of claim 10, wherein the instructions cause the processor electronics to:

display ads based on the determined geographic location of the user.

12. The processor-based system of claim 10, wherein the instructions cause the processor electronics to:

display ads that are valid within a desired distance of the user.

13. The processor-based system of claim 10, further comprising a clock for determining a time, wherein the instructions cause the processor electronics to:

determine the time from the clock; and change the icon that defines one or more characteristics of the user to which ads are to be directed based on the determined time.

14. The processor-based system of claim 10, wherein the instructions are executable by the processor electronics to:

download one or more characteristics of a persona from a remote computing device;

combine the one or more characteristics of the persona with the one or more characteristics associated to the icon; and receive ads selected by the advertiser based on the combined data comprising the one or more characteristics of the persona and the one or more characteristics of the user associated to the icon.

15. The processor-based system of claim 10, wherein the instructions further cause the processor electronics to download a persona from a remote computing device;

modify the persona by deleting at least one characteristic associated to the downloaded persona in response to a user request; and receive ads selected by the advertiser based on the modified persona.

16. The processor-based system of claim 10, wherein the instructions further cause the processor electronics to:

display a representation of a persona created by another user and stored on a remote computing device;

in response to user selection of the representation, transmit an indication to the remote computing device indicating selection of the persona; and receive ads selected for the persona.

17. A processor-based system for receiving advertisements, comprising:

memory for storing instructions that are executable by processor electronics;

a sensor for determining a location of the system;

a user input device;

processor electronics configured to execute the instructions in order to:

receive a selection from a user to activate an icon to which advertisements can be directed during a time period when the icon is active, wherein the icon defines one or more characteristics of the user that can be analyzed by an advertiser to determine a target audience for an ad;

in response to the selection of the icon, select a cookie associated to the icon, wherein the cookie is configured to reference a portion of user interest data collected during the period of time when the icon is active;

display an ad directed to the selected icon;

determine the location of the system;

automatically selecting a second icon that defines one or more characteristics of the user to which ads are to be directed based on the determined location;

in response to the selection of the second icon, select a second cookie associated to the second icon, wherein the second cookie is configured to reference a portion of user interest data collected during a second time period that the second icon is active;

in further response to the selection of the second icon, display to the user the second icon defining one or more characteristics of the user, wherein the active icon is displayed to the user as the currently active icon; and in response to receiving a user query by operation of the user input device, transmit the user query and data based at least on a cookie associated to the second icon to an Internet search engine.

18. The processor-based system of claim 17, wherein cookie associated to the second icon is stored within the memory.

19. The processor-based system of claim 17, wherein the instructions further cause the processor electronics to:

display a representation of a persona created by another user and stored on a remote computing device;

in response to user selection of the representation, transmit an indication to the remote computing device indicating selection of the persona; and receive ads selected for the persona.

20. The processor-based system of claim 17, wherein the instructions are executable by the processor electronics to:

download one or more characteristics of a persona from a remote computing device;

combine the one or more characteristics of the persona with the one or more characteristics associated to the icon; and receive ads selected by the advertiser based on the combined data comprising the one or more characteristics of the persona and the one or more characteristics of the user associated to the icon.

\* \* \* \* \*